(12) United States Patent (10) Patent No.: US 9,882,796 B2
Ariga et al. (45) Date of Patent: Jan. 30, 2018

(54) APPARATUS AND METHOD FOR SUPPRESSING A DELAY IN MONITORING COMMUNICATION

(71) Applicant: FUJITSU LIMITED, Kawasaki-shi, Kanagawa (JP)

(72) Inventors: Toshiro Ariga, Yokohama (JP); Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 349 days.

(21) Appl. No.: 14/725,733

(22) Filed: May 29, 2015

(65) Prior Publication Data

US 2015/0381449 A1 Dec. 31, 2015

(30) Foreign Application Priority Data

Jun. 26, 2014 (JP) ................. 2014-131005

(51) Int. Cl.
*H04L 12/26* (2006.01)
*H04L 12/24* (2006.01)

(52) U.S. Cl.
CPC ........ *H04L 43/0852* (2013.01); *H04L 41/147* (2013.01); *H04L 41/5019* (2013.01)

(58) Field of Classification Search
CPC ............. H04L 43/0852; H04L 41/5019; H04L 41/147
See application file for complete search history.

(56) References Cited

U.S. PATENT DOCUMENTS

| 2003/0069972 | A1 | 4/2003 | Yoshimura et al. |
| 2003/0137933 | A1* | 7/2003 | Yamada ............... H04L 12/5601 370/225 |
| 2012/0185856 | A1 | 7/2012 | Ashihara et al. |
| 2013/0191829 | A1 | 7/2013 | Shimokawa et al. |
| 2015/0063096 | A1* | 3/2015 | Huang ................ H04L 43/0852 370/225 |

FOREIGN PATENT DOCUMENTS

| JP | 2003-67351 | 3/2003 |
| JP | 2003-124976 | 4/2003 |
| JP | 2008-217302 | 9/2008 |
| JP | 2008-271050 | 11/2008 |
| JP | 2011-70549 | 4/2011 |
| JP | 2011-81579 | 4/2011 |
| JP | 2013-150134 | 8/2013 |

* cited by examiner

*Primary Examiner* — Gbemileke J Onamuti
(74) *Attorney, Agent, or Firm* — Staas & Halsey LLP

(57) ABSTRACT

A management apparatus acquires state information indicating a state of a monitoring target by communicating with the monitoring target through a first monitoring path at a monitoring timing for monitoring the monitoring target, and detects a use state of the first monitoring path. Upon determining, based on the use state, that a delay is expected to occur in at a next monitoring timing, the management apparatus changes the first monitoring path to a second monitoring path different from the first monitoring path, and communicates with the monitoring target through the changed second monitoring path.

17 Claims, 20 Drawing Sheets

FIG. 7

| T1 ↙ MIGRATION SOURCE HOST SERVER | MIGRATION SOURCE IP ADDRESS | MIGRATION DESTINATION HOST SERVER | MIGRATION DESTINATION IP ADDRESS | MIGRATION PATH |
|---|---|---|---|---|
| SVR1 | 192.168.1.10 | SVR2 | 192.168.1.11 | · "[SVR1-PRT2]=>[SW6-PRT1]=>[SW6-PRT2]=>[SVR2-PRT1]" (PATH 1)<br>· ... |
| SVR1 | 192.168.1.10 | SVR3 | 192.168.1.12 | · "[SVR1-PRT1]=>[SW5-PRT1]=>[SW5-PRT2]=>[SW2-PRT1]=><br>[SVR2-PRT2]=>[SVR8-PRT1]=>[SVR3-PRT1]" (PATH 2)<br>· "[SVR1-PRT1]=>[SW5-PRT1]=>[SW5-PRT3]=>[SW4-PRT1]=><br>[SW4-PRT2]=>[SW8-PRT3]=>[SW8-PRT2]=>[SVR3-PRT1]" (PATH 3)<br>· ... |
| SVR2 | 192.168.1.11 | SVR1 | 192.168.1.10 | · "[SVR2-PRT1]=>...=>[SW1-PRT2]"<br>· ... |
| SVR2 | 192.168.1.11 | SVR3 | 192.168.1.12 | · "[SVR2-PRT2]=>...=>[SW3-PRT2]"<br>· ... |
| SVR3 | 192.168.1.12 | SVR1 | 192.168.1.10 | · "[SVR3-PRT1]=>...=>[SW1-PRT1]"<br>· ... |
| SVR3 | 192.168.1.12 | SVR2 | 192.168.1.11 | · "[SVR3-PRT2]=>...=>[SW3-PRT2]"<br>· ... |
| ... | ... | ... | ... | ... |

| T2 | MONITORING TARGET | MONITORING TARGET IP ADDRESS | MONITORING PATH |
|---|---|---|---|
| LN41 → | SVR1 | 192.168.1.10 | • "[M1]=>[SW1-PRT1]=>[SW1-PRT2]=>[SW2-PRT3]=>[SW2-PRT1]=>[SW5-PRT2]=>[SW5-PRT1]=>[SVR1-PRT1]" (PATH 4)<br>• "[M1]=>[SW1-PRT1]=>[SW1-PRT3]=>[SW3-PRT1]=>[SW3-PRT2]=>[SW6-PRT3]=>[SW6-PRT1]=>[SVR1-PRT2]" (PATH 5)<br>• "[M1]=>[SW1-PRT1]=>[SW1-PRT4]=>[SW4-PRT4]=>[SW4-PRT3]=>[SW6-PRT4]=>[SW6-PRT1]=>[SVR1-PRT2]" (PATH 6)<br>• ... |
| | ... | ... | ... |
| LN42 → | VM1 | 192.168.1.13 | • "[M1]=>[SW1-PRT1]=>[SW1-PRT2]=>[SW2-PRT3]=>[SW2-PRT1]=>[SW5-PRT2]=>[SW5-PRT1]=>[VM1-PRT1]" (PATH 7)<br>• "[M1]=>[SW1-PRT1]=>[SW1-PRT3]=>[SW3-PRT1]=>[SW3-PRT2]=>[SW6-PRT3]=>[SW6-PRT1]=>[VM1-PRT2]" (PATH 8)<br>• "[M1]=>[SW1-PRT1]=>[SW1-PRT4]=>[SW4-PRT4]=>[SW4-PRT3]=>[SW6-PRT4]=>[SW6-PRT1]=>[VM1-PRT2]" (PATH 9)<br>• ... |
| | VM2 | 192.168.1.14 | ... |
| | ... | ... | ... |

FIG. 9

| | SWITCH | RECEPTION PORT | DESTINATION IP ADDRESS | TRANSMISSION PORT |
|---|---|---|---|---|
| LN21 | SW5 | 1 | 192.168.1.12 | 2 |
| LN22 | SW2 | 1 | 192.168.1.12 | 2 |
| LN23 | SW8 | 1 | 192.168.1.12 | 2 |
| LN24 | SW1 | 1 | 192.168.1.10 | 2 |
| LN25 | SW2 | 3 | 192.168.1.10 | 1 |
| LN26 | SW5 | 2 | 192.168.1.10 | 1 |
| LN27 | SW5 | 1 | 192.168.1.5 | 2 |
| LN28 | SW2 | 1 | 192.168.1.5 | 3 |
| LN29 | SW1 | 2 | 192.168.1.5 | 1 |
| LN30 | SW1 | 1 | 192.168.1.13 | 2 |
| LN31 | SW2 | 3 | 192.168.1.13 | 1 |
| LN32 | SW5 | 2 | 192.168.1.13 | 1 |
| | ... | ... | ... | ... |

| MANAGEMENT TARGET | TYPE | IP ADDRESS | MAC ADDRESS | VM-OPERATING HOST | IMAGE SIZE |
|---|---|---|---|---|---|
| SVR1 | VMHost | 192.168.1.10 | 60:EB:69:08:10:4A | — | — |
| SVR2 | VMHost | 192.168.1.11 | 60:AF:43:11:23:E5 | — | — |
| SVR3 | VMHost | 192.168.1.12 | 60:EB:69:21:32:68 | — | — |
| VM1 | VMGuest | 192.168.1.13 | 60:1B:32:F2:FE:43 | SVR1 | 30 GB |
| VM2 | VMGuest | 192.168.1.14 | 60:EB:69:15:11:21 | SVR1 | 60 GB |
| VM3 | VMGuest | 192.168.1.15 | 60:DB:32:14:11:A1 | SVR1 | 30 GB |
| ... | ... | ... | ... | ... | ... |
| VMn | VMGuest | 192.168.1.1n | 60:23:F1:A2:F3:S1 | SVR1 | 30 GB |

| MONITORING TARGET | MONITORING INTERVAL |
|---|---|
| VM1 | 5 MINUTES |
| VM2 | 10 MINUTES |
| VM3 | 5 MINUTES |
| ... | ... |
| VMn | 10 MINUTES |

| MONITORING TARGET | MONITORING TIME |
|---|---|
| VM1 | 14:31:22 |
| VM2 | 14:41:22 |
| VM3 | 14:33:20 |
| ... | ... |
| VMn | 14:42:22 |

| TENANT NAME | MONITORING TARGET | SERVICE LEVEL |
|---|---|---|
| TENANT A | VM1 | 99.999% |
| TENANT B | VM2 | 99.99% |
| TENANT C | VM3 | 99.9999% |
| ... | ... | ... |
| TENANT X | VMn | 99.999% |

| SWITCH | IP ADDRESS | MAC ADDRESS | PORT | BW | STATUS |
|---|---|---|---|---|---|
| SW1 | 192.168.1.100 | 00:1E:68:85:F8:DD | 1 | 10 Gbps | NORMAL |
| | | | 2 | 10 Gbps | NORMAL |
| | | | 3 | 10 Gbps | NORMAL |
| | | | 4 | 10 Gbps | LACK OF BW |
| SW2 | 192.168.1.101 | 00:23:8B:17:72:3F | 1 | 10 Gbps | NORMAL |
| | | | 2 | 10 Gbps | NORMAL |
| | | | 3 | 10 Gbps | NORMAL |
| | | | 4 | 10 Gbps | NORMAL |
| | | | 5 | 10 Gbps | NORMAL |
| SW3 | 192.168.1.102 | 00:22:8A:14:13:5C | 1 | 10 Gbps | NORMAL |
| | | | 2 | 10 Gbps | NORMAL |
| | | | 3 | 10 Gbps | NORMAL |
| | | | 4 | 10 Gbps | LACK OF BW |
| | | | 5 | 10 Gbps | NORMAL |
| | | | 6 | 10 Gbps | NORMAL |
| | | | 7 | 10 Gbps | NORMAL |
| SW4 | 192.168.1.103 | 00:1E:68:85:F5:F5 | 1 | 10 Gbps | LACK OF BW |
| | | | 2 | 10 Gbps | NORMAL |
| | | | 3 | 10 Gbps | LACK OF BW |
| | | | 4 | 10 Gbps | LACK OF BW |
| | | | 5 | 10 Gbps | LACK OF BW |
| SW5 | ... | ... | ... | ... | ... |
| SW6 | ... | ... | ... | ... | ... |
| ... | ... | ... | ... | ... | ... |

| VIRTUAL MACHINE | IMAGE SIZE | ACTUAL COMMUNICATION TIME |
|---|---|---|
| VM11 | 30 GB | 10 MINUTES |
| VM12 | 60 GB | 20 MINUTES |
| VM13 | 30 GB | 10 MINUTES |

| PORT NAME | PROTOCOL | TYPE |
|---|---|---|
| 902 | TCP OR UDP | MIGRATION |
| ... | ... | ... |

| TRANSMISSION PORT | DESTINATION IP ADDRESS |
|---|---|
| 1 | 192.168.1.5 |
| 2 | — |
| 3 | 192.168.1.10, 192.168.1.12 192.168.1.13 |
| 4 | — |
| 5 | — |
| 6 | — |
| 7 | — |

| | SWITCH | RECEPTION PORT | DESTINATION IP ADDRESS | TRANSMISSION PORT |
|---|---|---|---|---|
| LN21 | SW5 | 1 | 192.168.1.12 | 2 |
| LN22 | SW2 | 1 | 192.168.1.12 | 2 |
| LN23 | SW8 | 1 | 192.168.1.12 | 2 |
| LN24 | SW1 | 1 | 192.168.1.10 | 3 |
| LN25 | SW3 | 1 | 192.168.1.10 | 2 |
| LN26 | SW6 | 3 | 192.168.1.10 | 1 |
| LN27 | SW6 | 1 | 192.168.1.5 | 3 |
| LN28 | SW3 | 2 | 192.168.1.5 | 1 |
| LN29 | SW1 | 3 | 192.168.1.5 | 1 |
| LN30 | SW1 | 1 | 192.168.1.13 | 3 |
| LN31 | SW3 | 1 | 192.168.1.13 | 2 |
| LN32 | SW6 | 3 | 192.168.1.13 | 1 |
| | ... | ... | ... | ... |

| PERIODIC BACKUP TARGET | PERIODIC BACKUP TARGET IP ADDRESS | BACKUP PATH |
|---|---|---|
| SVR1 | 192.168.1.10 | • "[SVR1-PRT1]=>[SW1-PRT1]=>[SW5-PRT2]=>[SW2-PRT3]=>[SW1-PRT2]=>[SW1-PRT1]=>[M1]" (PATH 10)<br>• "[SVR1-PRT3]=>[SW1-PRT1]=>[SW6-PRT3]=>[SW3-PRT2]=>[SW1-PRT1]=>[M1]" (PATH 11)<br>• "[SVR1-PRT4]=>[SW1-PRT1]=>[SW6-PRT1]=>[SW4-PRT3]=>[SW1-PRT1]=>[M1]" (PATH 12)<br>... |
| SVR2 | 192.168.1.11 | • "[SVR1]=>...=>[M1]"<br>• "[SVR1]=>...=>[M1]"<br>• "[SVR1]=>...=>[M1]"<br>... |

| VIRTUAL MACHINE | IMAGE SIZE | ACTUAL COMMUNICATION TIME |
|---|---|---|
| VM21 | 30 GB | 20 MINUTES |
| VM22 | 60 GB | 40 MINUTES |
| VM23 | 30 GB | 20 MINUTES |

| PORT NAME | PROTOCOL | TYPE |
|---|---|---|
| 902 | TCP OR UDP | MIGRATION |
| 4972 | UDP | BACKUP |
| 4973 | UDP | BACKUP |
| ... | ... | ... |

APPARATUS AND METHOD FOR SUPPRESSING A DELAY IN MONITORING COMMUNICATION

CROSS-REFERENCE TO RELATED APPLICATION

This application is based upon and claims the benefit of priority of the prior Japanese Patent Application No. 2014-131005, filed on Jun. 26, 2014, the entire contents of which are incorporated herein by reference.

FIELD

The embodiments discussed herein are related to apparatus and method for suppressing a delay in monitoring communication.

BACKGROUND

In an information processing system including a network of a plurality of communication apparatuses (for example, a switch) and an information processing apparatus (for example, a server) which is connected to the network, an information processing apparatus and a virtual computer which operates on the information processing apparatus provide an information processing service.

In the aforementioned system, a management apparatus manages the information processing apparatus and the virtual computer (hereinafter, appropriately referred to as a virtual machine).

Japanese Laid-open Patent Publication No. 2008-271050, Japanese Laid-open Patent Publication No. 2008-217302, Japanese Laid-open Patent Publication No. 2003-67351, Japanese Laid-open Patent Publication No. 2011-81579, Japanese Laid-open Patent Publication No. 2011-70549, Japanese Laid-open Patent Publication No. 2003-124976, and Japanese Laid-open Patent Publication No. 2013-150134 are examples of the related art.

SUMMARY

According to an aspect of the invention, an apparatus acquires state information indicating a state of a monitoring target by communicating with the monitoring target through a first monitoring path in a communication network at a monitoring timing for monitoring the monitoring target, and detects a use state of the first monitoring path. Upon determining, based on the use state, that a delay is expected to occur at a next monitoring timing, the apparatus changes the first monitoring path to a second monitoring path different from the first monitoring path, and communicates with the monitoring target through the changed second monitoring path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a migration path table, according to an embodiment;

FIG. 8 is a diagram illustrating an example of a monitoring path table, according to an embodiment;

FIG. 9 is a diagram illustrating an example of a transfer path table, according to an embodiment;

FIG. 10 is a diagram illustrating an example of a management server information table, according to an embodiment;

FIG. 11 is a diagram illustrating an example of a monitoring timing table, according to an embodiment;

FIG. 12 is a diagram illustrating an example of a monitoring history table, according to an embodiment;

FIG. 13 is a diagram illustrating an example of a service level table, according to an embodiment;

FIG. 14 is a diagram illustrating an example of a switch table, according to an embodiment;

FIG. 15 is a diagram illustrating an example of a migration execution history table, according to an embodiment;

FIG. 16 is a diagram illustrating an example of a delay-detecting information table, according to an embodiment;

FIG. 21 is a diagram illustrating an example of a packet transfer path table, according to an embodiment;

FIG. 22 is a diagram illustrating an example of a changed transfer path table, according to an embodiment;

FIG. 23 is a diagram illustrating an example of a backup path table, according to an embodiment;

FIG. 24 is a diagram illustrating an example of a backup execution history table, according to an embodiment; and FIG. 25 is a diagram illustrating an example of a delay-detecting information table, according to an embodiment.

DESCRIPTION OF EMBODIMENTS

A management apparatus communicates with a monitoring target (for example, a virtual machine (VM)) at a predetermined monitoring timing and then acquires state information indicating a state of the monitoring target from the monitoring target. The state information includes information indicating states in which, for example, the monitoring target is normally operated and the monitoring target is not normally operated due to the occurrence of an abnormality.

Hereinafter, a communication which the management apparatus performs with the monitoring target is appropriately referred to as a monitoring communication. Also, a network path which is used by the monitoring communication is appropriately referred to as a monitoring path. Meanwhile, the network path is also called a communication path.

In the above-described information processing system, it is assumed that the communication of a large amount of data is suddenly (also called "temporarily") executed in the network path. As an example of a large amount of data communication, the migration of the virtual machine may be exemplified.

In a case where there is a path which is shared by (in other words, an overlapped path) both a network path in which the communication of a large amount of data is executed and a monitoring path, a communication delay of the monitoring communication may occur due to the communication of a large amount of data.

When the communication delay of the monitoring communication occurs, the management apparatus acquires information relating to the state of the monitoring target at a time delayed from a predetermined monitoring timing. This delay may prevent the management apparatus from acquiring information relating to the state of the monitoring target in real time. For this reason, when the abnormality occurs in the monitoring target, an administrator of the information processing system has difficulty in rapidly dealing with the abnormality.

First Embodiment

Information Processing System

Figure 1:
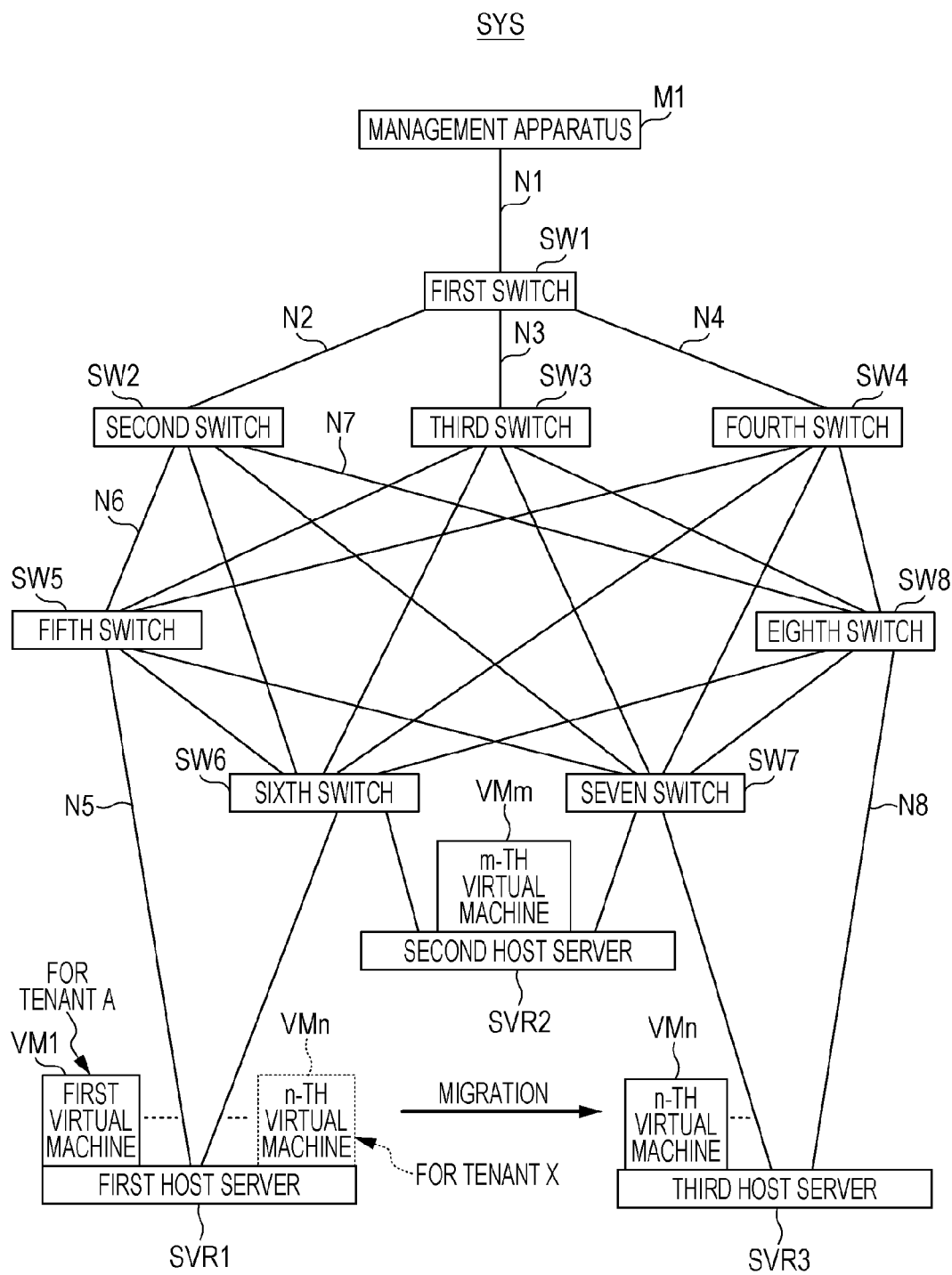
FIG. 1 is a diagram illustrating an example of a configuration of an information processing system, according to an embodiment.

FIG. 1 is a diagram illustrating an example of a configuration of an information processing system, according to an embodiment. In the following description, the same constituent element is given the same reference numeral. Therefore, regarding the constituents which are given the same reference numerals, repeated description will be omitted.

An information processing system SYS is, for example, a large scale data center providing a cloud service (infrastructure as a service (IaaS)) to customers (for example, companies, schools, and individuals) of a business operator.

The business operator provides, for example, a virtual machine which operates on a physical server to the customers via the information processing system SYS. Hereinafter, the above-described customer is appropriately referred to as a tenant.

In the example of FIG. 1, the business operator provides, for example, a first virtual machine VM1 (refer to an arrow of solid line "for tenant A") to a tenant A, and provides an n-th virtual machine VMn (refer to an arrow of dotted line "for tenant X") to a tenant X. Meanwhile, a small letter n denotes an integer of 2 or more.

In FIG. 1, solid lines connecting blocks to each other illustrates network connection between blocks. The network connection is, for example, a local area network (LAN), and for example, Ethernet (trade mark) is used as an example of the LAN. The network connection is also called a network path.

The information processing system SYS includes a management apparatus M1, a network including a first switch SW1 to an eighth switch SW8, and a first host server SVR1 to a third host server SVR3. The management apparatus M1 executes, when reaching a monitoring timing, communication so as to acquire state information from a monitoring target which executes an information process. Meanwhile, the monitoring targets are the first host server SVR1 to the third host server SVR3, and the first virtual machine VM1 to the n-th virtual machine VMn.

The first switch SW1 to the eighth switch SW8 are also called a transfer apparatus which transfers data, and is, for example, a layer 3 switch which transfers data through a network layer in an open systems interconnection (OSI) reference model.

The first switch SW1 to the eighth switch SW8 include a plurality of ports, and each port is network-connected to ports of other switches.

For example, the first switch SW1 includes four or more ports. The first switch SW1 is network-connected to the management apparatus M1 (refer to a network N1) via a first port, and is network-connected to the second switch SW2 (refer to a network N2) via a second port. Further, the first switch SW1 is network-connected to the third switch SW3 (refer to a network N3) via a third port, and is network-connected to the fourth switch SW4 (refer to network N4) via a fourth port.

Each of the first host server SVR1 to the third host server SVR3 is a physical server, and activates a plurality of virtual machines by virtualizing hardware resources so as to operate the virtual machines. The first host server SVR1 operates, for example, the first virtual machine VM1 to the n-th virtual machine VMn. The second host server SVR2 operates, for example, an m-th virtual machine VMm. A small letter m denotes an integer of 2 or more. Meanwhile, the virtual machine is operated as a guest with respect to the host server.

The information processing system SYS provides the virtual machine to each tenant. In FIG. 1, the number of management apparatuses, the number of switches, the number of host servers, and the number of virtual machines are illustrated by an example.

In the network of the information processing system SYS, for example, a computer network (for example, Ethernet), and a storage network (for example, a fibre channel storage area network (FC-SAN)) are integrated.

Switching of Communication Packet

Figure 2:
FIG. 2 is a diagram illustrating an example of a packet transfer table, according to an embodiment.

FIG. 2 is a diagram illustrating an example of a packet transfer table, according to an embodiment. The switching of a communication packet is executed through a switch in FIG. 1 by using a packet transfer table. The communication packet is a packet which is suitable for a transmission control protocol (TCP)/internet protocol (IP). The communication packet includes, for example, a destination IP address, a source IP address, a destination port number, a source port number, and other various items of data. For example, the first switch SW1 in FIG. 1 stores a packet transfer table T in FIG. 2.

The packet transfer table T in FIG. 2 includes a transmission port field and a destination IP address field. The destination IP address field stores the destination IP address. The transmission port field stores an identifier (ID) of a transmission port from which the received communication packet is transmitted.

The packet transfer table T stores, in each of rows, a destination IP address in association with the ID of a port that transmits the communication packet including the destination IP address. The first switch SW1 includes the first to fourth ports as illustrated in FIG. 1, and the first to fourth ports are respectively specified as the transmission port ID "1" to "4". Meanwhile, in the description of drawings below, "-" (a hyphen) indicates that data is not stored.

The first switch SW1 receives a communication packet including the destination IP address "192.168.1.5" from, for example, the second switch SW2. Here, the IP address "192.168.1.5" is an IP address which has been set to the management apparatus M1. Note that, a data field of the communication packet includes information indicating the state of the first virtual machine VM1.

The first switch SW1, when receiving the communication packet, specifies a transmission port ID (ID1) in a row that stores the destination IP address "192.168.1.5" included in the received communication packet, in the packet transfer table T. Then, the first switch SW1 transmits the received communication packet to a first port identified by the transmission port ID1. That is, the first switch SW1 transmits the received communication packet to the management apparatus M1 which is connected to the first port thereof.

In addition, the first switch SW1 receives a communication packet including a destination IP address "192.168.1.10" from, for example, the management apparatus M1. Here, the IP address "192.168.1.10" is an IP address which has been set to the first host server SVR1. Note that, the data field of the communication packet includes instruction command which instructs the first host server SVR1 to send notification of the state of the first host server SVR1 or the first virtual machine VM1.

The first switch SW1, upon receiving the communication packet, specifies a transmission port ID2 (ID2) in a row that stores a destination IP address "192.168.1.10" included in the received communication packet is stored, in the packet transfer table T. Then, the first switch SW1 transmits the received communication packet to the second port identified by the transmission port ID2. That is, the first switch SW1 transmits the received communication packet to the second switch SW2 which is connected to the second port thereof.

Each of the second switch SW2 to the eighth switch SW8 stores therein a packet transfer table in the formation indicated in FIG. 2. Then, the second switch SW2 to the eighth switch SW8 each transfer the received communication packet based on the packet transfer table, as illustrated in FIG. 2.

A Large Amount of Data Communication

In the communication of the information processing system SYS as illustrated in FIG. 1, a communication delay of the monitoring communication may suddenly occur in some cases. One cause of the communication delay is that, for example, the communication of a large amount of data is suddenly executed in a local network path in the information processing system SYS. Migration of the virtual machine is an example of the large amount of data communication.

The communication for migration is a communication relating to migration in which a virtual machine being operated by a first information processing apparatus is migrated from the first information processing apparatus to a second information processing apparatus different from the first information processing apparatus so that the virtual machine is operated by the second information processing apparatus. Here, for example, the first information processing apparatus is the first host server SVR1, the second information processing apparatus is the third host server SVR3, and the virtual machine is the n-th virtual machine VMn.

Hereinafter, in a case where the migration of the virtual machine is executed, a path through which data relating to the migration is transferred is appropriately referred to as a migration path.

In the migration of the n-th virtual machine VMn, a migration path between the first host server SVR1 and the third host server SVR3 is assumed to be, for example, the following path including: a network N5 between the first host server SVR1 and a fifth switch SW5, a network N6 between the fifth switch SW5 and the second switch SW2, a network N7 between the second switch SW2 and the eighth switch SW8, and a network N8 between the eighth switch SW8 and the third host server SVR3.

In the execution of the above-described migration, a large amount of data relating to the virtual machine to be migrated is transferred through the migration path (the networks N5 to N8). As a result of the transfer, the communication bandwidth of the migration path is pressured, and thus the communication delay occurs in other data communication.

Monitoring Communication

Examples of a case where the communication delay occurs in other data communication include monitoring communication executed by the management apparatus M1. The management apparatus M1 monitors a state of the monitoring targets by executing monitoring communication with the monitoring targets. The monitoring targets are, for example, the first virtual machine VM1 to the n-th virtual machine VMn which are operated on the first host server SVR1. The management apparatus M1 acquires the information relating to the state of the monitoring targets by executing the monitoring communication with the monitoring targets. Then, the management apparatus M1 monitors the monitoring targets by referring to the acquired state information, and notifies the administrator of the information processing system SYS of the monitoring result. The monitoring result indicates that each monitoring target is operating normally or is in the abnormal state.

The monitoring path (also called the management path or a polling path) through which the management apparatus M1 executes the monitoring communication with the first virtual machine VM1 to the n-th virtual machine VMn is, for example, the following path including: a network N1 between the management apparatus M1 and the first switch SW1, a network N2 between the first switch SW1 and the second switch SW2, a network N6 between the second switch SW2 and the fifth switch SW5, and a network N5 between the fifth switch SW5 and the first host server SVR1.

Communication Delay

The above-described migration path (networks N5, N6, N7, and N8) and the above-described monitoring path (networks N1, N2, N5, and N6) include common portions therebetween (the networks N5 and N6), (also called an overlapped path). In the overlapped path, the communication for migration of the n-th virtual machine VMn and the monitoring communication for the first virtual machine VM1 to the n-th virtual machine VMn are executed at the same time.

Due to a large amount of data communication for migration of the n-th virtual machine VMn, the communication for migration pressures the communication bandwidth of the common path. For this reason, the communication delay occurs in the monitoring communication for the first virtual machine VM1 to the n-th virtual machine VMn.

When the communication delay occurs in the monitoring communication, the management apparatus acquires the information relating to the state of the monitoring target at a time delayed from a predetermined monitoring timing. Therefore, in a case where a certain abnormality occurs in the first virtual machine VM1 to the n-th virtual machine VMn, the detection of the abnormality by the management apparatus M1 at the predetermined monitoring timing may be delayed. As a result, in a case where the abnormality occurs in the monitoring target, the administrator of the information processing system SYS has difficulty in rapidly dealing with the abnormality. That is, the administrator of the information processing system SYS has difficulty in monitoring the state of the monitoring target with high accuracy.

Service Level

The business operator of the information processing system SYS guarantees a service level with respect to the tenant when providing the information processing service to each tenant. The service level (also called a service guarantee level) is defined, for example, as a ratio of a time period during which the virtual machine is normally operated, to a predetermined of time period.

For example, a predetermined time period is assumed to be 365 days (31,536,000 seconds (365×24×60×60 second)). Then, the business operator may set a service level which is guaranteed to the tenant, at 99.99%.

When the service level is 99.99%, the business operator is required to normally operate the virtual machine provided for the tenant during a time period of 31,536,000×0.9999 seconds (that is, 31,532,846.4 seconds) within the aforementioned predetermined time period of "365 days". As the service level is increased, that is, as the service level becomes close to 100%, it is preferable that the monitoring accuracy of the virtual machine is increased so as to rapidly detect the abnormality of the virtual machine, thereby allowing an abnormality to be rapidly dealt with.

However, as described above, in a state in which a delay is occurring in the monitoring communication of the monitoring target, when the abnormality occurs in the monitoring target, the administrator of the information processing system has difficulty in rapidly dealing with the abnormality. As a result, the business operator has difficulty in maintaining the service level which is guaranteed to the tenant.

In order to guarantee the above-described service level, the management apparatus M1 changes the monitoring path so that a delay does not occur in the monitoring communication of the virtual machine. The change of the monitoring path will be described with reference to FIG. 5.

Hardware Configuration

Figure 3:
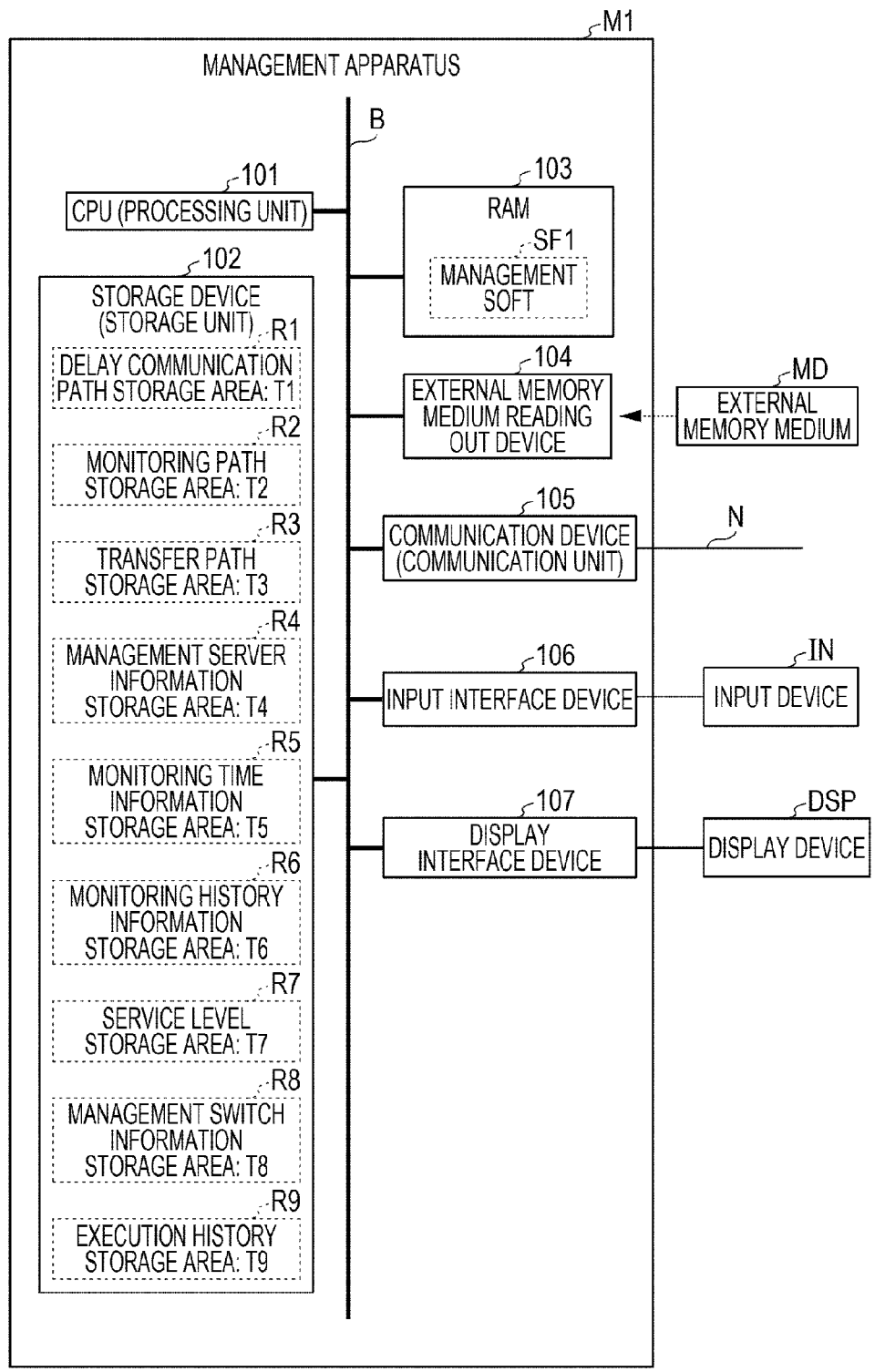
FIG. 3 is a diagram illustrating an example of a hardware configuration of a management apparatus, according to an embodiment.

FIG. 3 is a diagram illustrating an example of a hardware configuration of a management apparatus, according to an embodiment. For example, the management apparatus M1 in FIG. 1 may be configured as an information processing apparatus such as a server. Meanwhile, a management apparatus is also called a monitoring apparatus.

The management apparatus M1 includes a processing unit (CPU) 101, a storage device (a storage unit) 102, a RAM 103, an external memory medium read out device 104, a communication device (a communication unit) 105, an input interface device 106, and a display interface device 107, which are connected to a bus B. Meanwhile, CPU is an abbreviation of "Central Processing Unit" and RAM is an abbreviation of "Random Access Memory". Hereinafter, the processing unit (CPU) 101, the storage device (the storage unit) 102, and the communication device (the communication unit) 105 are appropriately referred to as a CPU 101, a storage 102, and a communication device 105, respectively.

The CPU 101 is a central calculation processing device controlling the entire management apparatus M1. The storage 102 is a mass storage device, such as a hard disk drive (HDD) or a solid state drive (SSD). The storage 102 includes storage areas R1 to R9 for storing a variety of items of information. The details of the storage areas R1 to R9 will be described with reference to FIG. 7 to FIG. 15. Further, the storage 102 stores an execution file (a program) of management software SF1 which controls the management of the monitoring target.

The RAM 103 temporarily stores data or the like which is generated (calculated) in a process executed by the CPU 101 or in each step executed by the management software SF1. The RAM 103 is a semiconductor memory, such as a dynamic random access memory (DRAM).

The CPU 101 reads out the execution file of the management software SF1 from the storage 102, and loads it into the RAM 103 when the management apparatus M1 is activated. Note that the execution file may be stored in an external memory medium MD.

The external memory medium read out device 104 is a device which functions as an interface connecting the management apparatus M1 and the external memory medium MD. The external memory medium read out device 104 may be, for example, a card slot or a Universal Serial Bus (USB) port.

The external memory medium MD is a portable non-volatile memory such as a USB memory. Meanwhile, the management apparatus M1 may be configured to connect, via the external memory medium read out device 104, with a memory-medium read-out device (not illustrated) for reading out data stored in the memory medium. The memory medium (also referred to as a recording medium) is a portable memory medium, such as a compact disc read only memory (CD-ROM) or a digital versatile disc (DVD).

The communication device 105 is, for example, a network interface card (NIC) including one or more ports. The communication device 105 provides an interface function with respect to the network N1.

The communication device 105 communicates with the monitoring target via the first path. The first path is, for example, a monitoring path, and is a path including the networks N1, N2, N6, and N5 in the example of FIG. 1. That is, the communication device 105 connects to a network including a plurality of switches, and then communicates with the monitoring target via a monitoring path in the network.

The input interface device 106 includes, for example, a USB port, and provides the interface function with respect to an input device IN. The input device IN is a device, such as a keyboard or a mouse for inputting a variety of items of information. The display interface device 107 includes, for example, a graphics board, and provides the interface function with respect to a display device DSP. The display device DSP is, for example, a liquid crystal display, or an organic electroluminescence (organic EL), which displays a variety of items of information.

Figure 4:
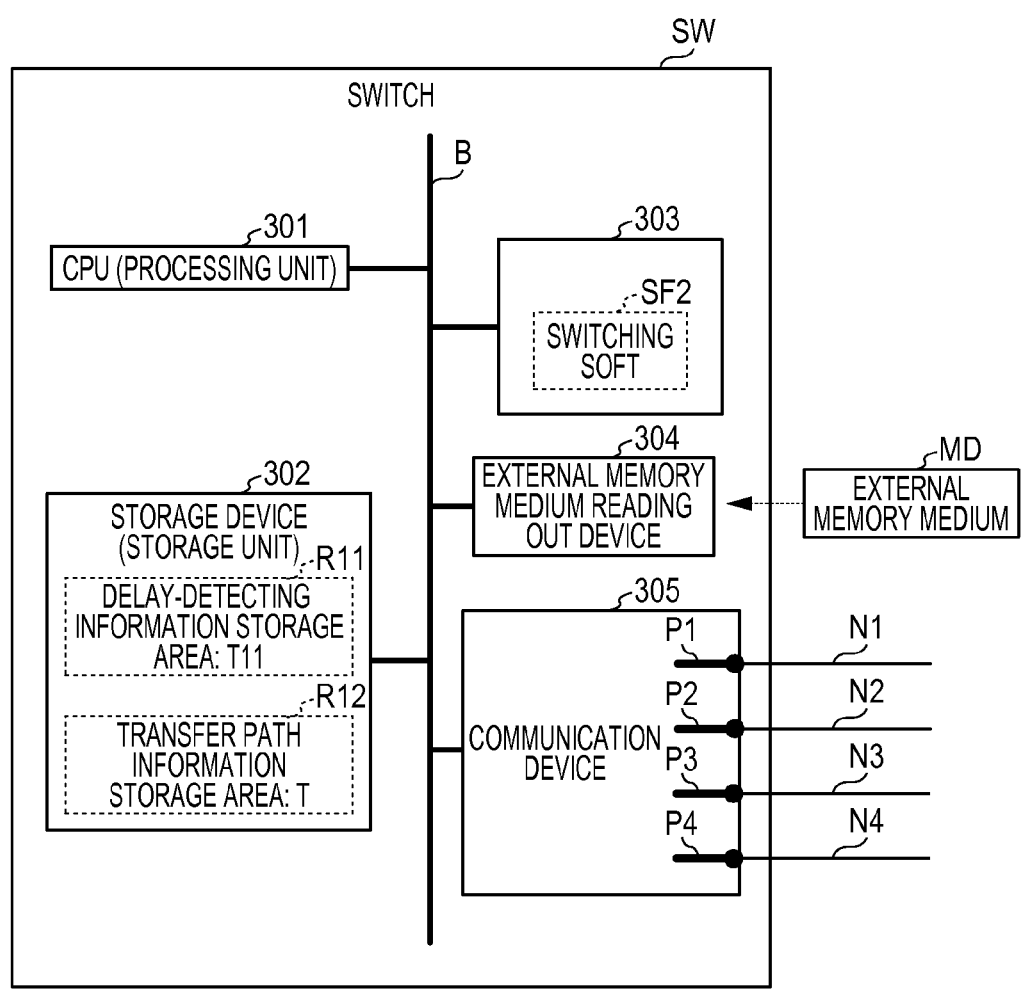
FIG. 4 is a diagram illustrating an example of a hardware configuration of a switch, according to an embodiment.

FIG. 4 is a diagram illustrating an example of a hardware configuration of a switch, according to an embodiment. A switch SW is, for example, the first switch SW1 illustrated in FIG. 1. The switch SW includes a processing unit (CPU) 301, a storage device (the storage unit) 302, a RAM 303, an external memory medium read out device 304, and a communication device 305, which are connected to the bus B. Hereinafter, the processing unit (CPU) 301 and the storage device (the storage unit) 302 are appropriately referred to as a CPU 301 and a storage 302, respectively.

The CPU 301 is a central calculation processing device for controlling the entire switch SW. The storage 302 is a mass storage device, such as a hard disk drive or a solid state drive.

The storage 302 includes storage areas R11 and R12 for storing a variety of items of information. Details of the storage area R11 will be described with reference to FIG. 16. A transfer path information storage area R12 is an area for storing a packet transfer table T (refer to FIG. 2) which is referred to when the switch SW executes switching of a communication packet. A state in which the packet transfer table T in FIG. 2 is stored in the transfer path information storage area R12 is schematically indicated by ": T" in the storage 302.

The storage 302 stores an execution file (a program) of switching software SF2 which controls the switching.

The RAM 303 temporarily stores data or the like which is generated (calculated) in a process executed by the CPU 301 or in each step executed by the switching software SF2. The RAM 303 is a semiconductor memory, such as a DRAM.

When the switch SW is activated, the CPU 301 reads out the execution file of the switching software SF2 from the storage 302 and loads it into the RAM 303. Note that, the execution file may be stored in the external memory medium MD.

The external memory medium read out device 304 is a device which functions as an interface connecting the switch SW and the external memory medium MD. The external memory medium read out device 304 may be, for example, a card slot or a USB port.

The communication device 305 includes, for example, an NIC, and provides an interface function with respect to the network N1. The communication device 305 includes a plurality of ports each connected to a port of other switches SW.

In a case where the switch SW in FIG. 4 is the first switch SW1 in FIG. 1, the communication device 305 includes a first port P1 to a fourth port P4. The first port P1 is connected to the network N1, the second port P2 is connected to the network N2, the third port P3 is connected to the network N3, and the fourth port P4 is connected to the network N4. Meanwhile, the number of ports (four) as illustrated in FIG. 4 is only an example.

The configuration of each of the second switch SW2 to the eighth switch SW8 as illustrated in FIG. 1 is the same as that of the switch SW in FIG. 4, and each switch is connected to other switches and the host server via the network.

Software Configuration

Figure 5:
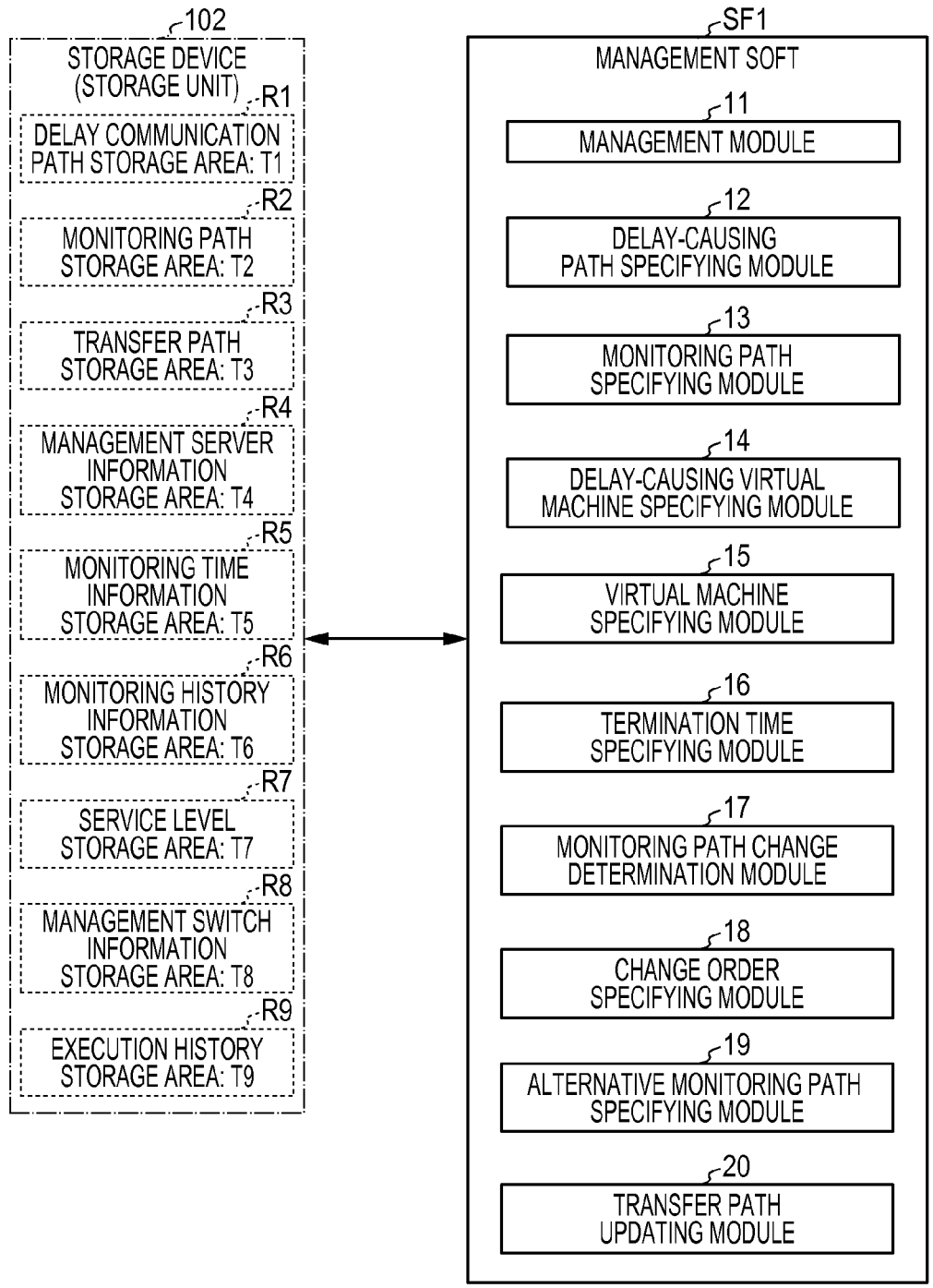
FIG. 5 is a diagram illustrating an example of a software configuration of a management apparatus, according to an embodiment.

FIG. 5 is a diagram illustrating an example of a software configuration of a management apparatus, according to an embodiment, which is illustrated as M1 in FIG. 1. Note that, for the sake of simple description, the storage 102 which is hardware is schematically indicated by a dashed line.

The management software SF1 includes a management module 11, a delay-causing path specifying module 12, a monitoring path specifying module 13, a delay-causing virtual machine specifying module 14, a virtual machine specifying module 15, a termination time specifying module 16, a monitoring path change determination module 17, a change order determination module 18, an alternative monitoring path specifying module 19, and a transfer path updating module 20.

The management module 11 executes a management process for the host server and the virtual machine. The management module 11 acquires information indicating a state of the monitoring target by communicating with the monitoring target and the communication device 105 at the time of monitoring the target. Then, the management module 11 monitors the monitoring target by referring to the acquired state information, and notifies the administrator of the information processing system SYS of the monitoring result, via the display device DSP.

The delay-causing path specifying module 12 specifies a path of the communication causing a communication delay in the monitoring path (for example, the communication for migration).

The monitoring path specifying module 13 specifies a monitoring path of the communication source server and a monitoring path of the monitoring target, with respect to the communication causing the communication delay.

The delay-causing virtual machine specifying module 14 specifies a virtual machine relating to the communication causing the communication delay in the monitoring path.

The virtual machine specifying module 15 specifies a virtual machine for which the delay of the monitoring communication occurs due to the communication that causes the communication delay in the monitoring path of the virtual machine. The termination time specifying module 16 specifies an expected termination time (also called ending time) of the communication causing the communication delay of the monitoring communication.

The monitoring path change determination module 17 detects a use state of a first path (for example, the current monitoring path) and then, based on the use state, determines whether or not a delay will occur in the monitoring communication at a next monitoring timing of acquiring the state information via the first path. In other words, the monitoring path change determination module 17 determines whether or not the monitoring communication at the next monitoring timing of acquiring the state information is affected by the use state.

The use state indicates whether or not the monitoring path of the monitoring target shares a common path with the path of a second communication (for example, the communication for migration) causing the delay in a first communication (for example, the monitoring communication) with the monitoring target via the monitoring path.

The monitoring path change determination module 17 detects the second communication, based on information indicating that the second communication is executed, which is notified from the switch provided between the management apparatus M1 and the monitoring target. The above-mentioned information will be described with reference to FIG. 17.

In the case of FIG. 1, the monitoring path is a path indicated by, for example, the networks N1, N2, N6, and N5; and the path of the second communication is a path indicated by the networks N5, N6, N7, and N8. The common path, which is a path indicated by the networks N5 and N6, is included in both the above two paths. Accordingly, in the case of the example in FIG. 1, the monitoring path change determination module 17 detects the use state of the first path as a state indicating that a common path is shared by the above two paths.

Then, the monitoring path change determination module 17 determines that a delay is expected to occur in the monitoring communication in a case where the second communication is continued at the next monitoring timing in the above-described determination.

In a case where there are a plurality of virtual machines whose monitoring paths are to be changed, the change order determination module 18 determines the change order of the monitoring paths based on the service level of the respective virtual machines whose monitoring paths are to be changed.

The alternative monitoring path specifying module 19 specifies a second monitoring path which is different from the first monitoring path of the monitoring target, so that the second monitoring path suppresses the delay in the monitoring communication.

Specifically, the second monitoring path is a path not including a portion overlapped with the path of the second communication (for example, the communication for migration) or a path whose portion overlapped with the path of the second communication is shorter than the common path shared by both the first path and the path of the second communication. In the case of FIG. 1, the second monitoring path is a network path passing through the management apparatus M1, the first switch SW1, the third switch SW3, the sixth switch SW6, and the first host server SVR1.

When it is determined that a delay is expected to occur in the monitoring communication at the next monitoring timing of acquiring the state information, the transfer path updating module 20 executes the following process. That is, the transfer path updating module 20 asks the respective switches to change the first monitoring path (the current monitoring path) of the monitoring target to a second monitoring path which is different from the first monitoring path. Hereafter, the management module 11 acquires information indicating a state of the monitoring target by communicating with the monitoring target via the communication device 105 through the second monitoring path which is changed from the first monitoring path, at the time of monitoring the target.

As described above, the management apparatus M1 changes the monitoring path of the monitoring target so that there is no portion thereof that is shared by both the path of the communication for migration and the monitoring path of the monitoring target, or a common portion shared by both the path of the communication for migration and the monitoring path of the monitoring target becomes shorter than before the change. As described above, the monitoring target in this case is a monitoring target whose monitoring communication is delayed due to the execution of the communication for migration.

By changing the monitoring path as described above, a common path that is shared by both the path of the communication for migration and the monitoring path of the monitoring target does not exist, or becomes shorter than before the change, thereby suppressing the communication delay in the monitoring communication with the monitoring target. As a result, it is possible to suppress the delay in the acquisition of the information indicating a state of the monitoring target. In other words, it is possible to suppress an effect on the acquisition of the information indicating a state of the monitoring communication.

Further, the management apparatus M1 changes the monitoring path of the monitoring target only in a case where it is determined that the delay is expected to occur in the monitoring communication of the monitoring target at the next monitoring timing. Therefore, it is not necessarily required to change the monitoring path for the reason that there exists a common path shared by both the path of the communication for migration and the monitoring path of the monitoring target. That is, it is possible to determine whether or not the monitoring path is to be changed by anticipating the use state of the monitoring path. As a result, it is unnecessary to cause the switch configuring the information processing system SYS to execute a redundant changing process of the transfer path, thereby reducing the load of the process of the switch.

Figure 6:
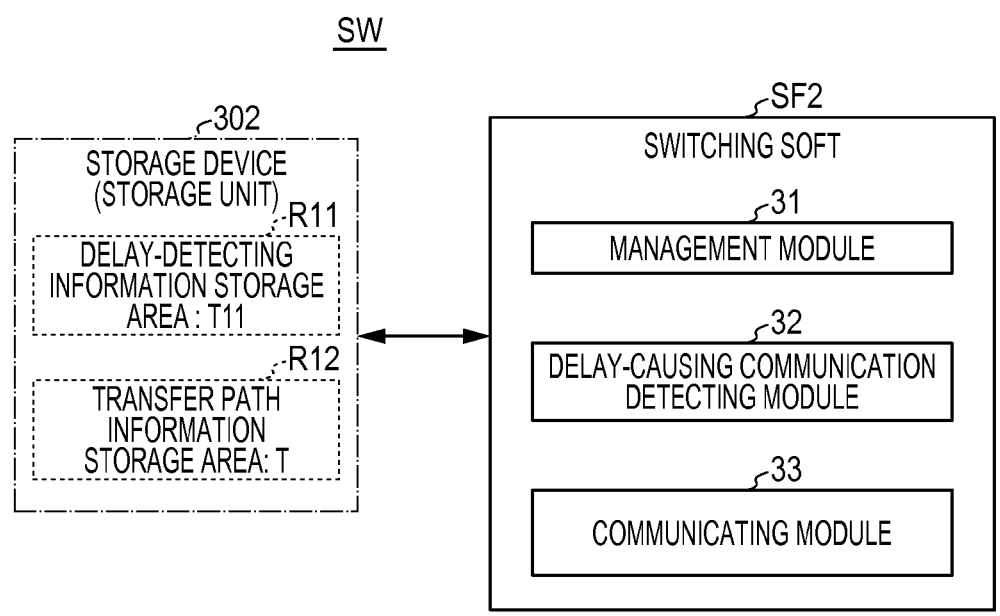
FIG. 6 is a diagram illustrating an example of a software configuration of a switch, according to an embodiment.

FIG. 6 is a diagram illustrating an example of a software configuration of a switch, according to an embodiment, which is illustrated as the switch SW in FIG. 1. For the sake of simple description, the storage 302 which is hardware is schematically indicated by a dashed line.

The switching software SF2 includes a management module 31, a delay-causing communication detecting module 32, and a communicating module 33.

The management module 31 executes the management process of the switch, and executes the switching process of the communication packet. The delay-causing communication detecting module 32 detects the communication of a large amount of data which becomes a cause of the monitoring delay of the monitoring communication. The communicating module 33 executes a process of communicating with the management apparatus M1.

All Migration Paths

FIG. 7 is a diagram illustrating an example of a migration path table, according to an embodiment, which is, for example, stored as the migration path table T1 in a delay communication path storage area R1 of the storage 102 in FIG. 3 and FIG. 5. The delay communication path storage area R1 is an area for storing the migration path table T1. A state in which the migration path table T1 is stored in the delay communication path storage area R1 is schematically indicated by ": T1" in the storage 102 of FIG. 3 and FIG. 5.

The migration path table T1 is a table storing all possible migration paths.

The migration path table T1 includes a migration source host server field and a migration source IP address field. Further, the migration path table T1 includes a migration destination host server field, a migration IP address field, and a migration path field.

The migration source host server field stores the ID of the migration source host server (hereinafter, appropriately referred to as a source host server SRC). The migration source IP address field stores an IP address set to the source host server SRC. The migration destination host server field stores the ID of the migration destination host server (hereinafter, appropriately referred to as a destination host server DST). The migration destination IP address field stores an IP address set to the destination host server DST. Meanwhile, the IDs of the source host server SRC and the destination host server DST correspond to the symbols (SVR1 to SVR3) of the host servers in FIG. 1.

The migration path field stores migration paths between the source host server SRC and the destination host server DST.

The migration path table T1 stores, in each of rows, the ID and the IP address of the source host server SRC, the ID and the IP address of the destination host server DST, and the migration paths between the source host server SRC and the destination host server DST in association with each other.

For example, the migration path table T1 stores, the ID "SVR1" of the first host server SVR1 and the IP address "192.168.1.10", the ID "SVR2" of the second host server SVR2 and the IP address "192.168.1.11", and the migration path between the first host server SVR1 and the second host server SVR2, in association with each other. The migration path between the first host server SVR1 and the second host server SVR2 is indicated by, for example, "[SVR1-PRT2]=>[SW6-PRT1]=>[SW6-PRT2]=>[SVR2-PRT1]" (path 1).

"SVRx" of [SVRx-PRTy] indicates an ID of the source host server SRC or the destination host server DST (a symbol identifying the host server in FIG. 1), where a small letter "x" denotes an integer of 1 or more. In addition, "PRTy" of [SVRx-PRTy] indicates a port ID for identifying a port of the host server identified by the SVRx, where a small letter "y" denotes an integer of 1 or more.

"SWz" of [SWz-PRTy] indicates an ID of the switch (a symbol of the switch in FIG. 1), where a small letter "z" denotes an integer of 1 or more. In addition, "PRTy" of [SWz-PRTy] indicates a port ID for identifying a port of the switch identified by the SWz.

"=>" schematically indicates a network path, in other words, a communication (including up and down). In the above description, a port corresponding to the port ID identified by the PRTy is appropriately referred to as a port y.

The path 1 indicates a network path passing through the port 2 of the first host server SVR1, the port 1 of the sixth switch SW6, the port 2 of the sixth switch SW6, and the port 1 of the second host server SVR2. Then, the path 1 indicates that the transmission and reception of the communication packet are performed between the first host server SVR1 and the second host server SVR2 via the network path.

The migration path field stores all of the network paths, that is, all of the migration paths between the source host server SRC and the destination host server DST in the information processing system SYS in FIG. 1.

Next, a migration path between the first host server SVR1 and the third host server SVR3 is indicated by, for example, "[SVR1-PRT1]=>[SW5-PRT1]=>[SW5-PRT2]=>[SW2-PRT1]=>[SW2-PRT2]=>[SW8-PRT1]=>[SW8-PRT2]=>[SVR3-PRT1]" (path 2).

The path 2 indicates a network path passing through the port 1 of the first host server SVR1, the port 1 of the fifth switch SW5, the port 2 of the fifth switch SW5, the port 1 of the second switch SW2, the port 2 of the second switch SW2, the port 1 of the eighth switch SW8, the port 2 of the eighth switch SW8, and the port 1 of the third host server SVR3. Then, the path 2 indicates that the transmission and reception are performed between the communication packet between the first host server SVR1 and the third host server SVR3 via the network path.

In addition, a migration path between the first host server SVR1 and the third host server SVR3 is indicated by, for example, "[SVR1-PRT1]=>[SW5-PRT1]=>[SW5-PRT3]=>[SW4-PRT1]=>[SW4-PRT2]=>[SVR8-PRT3]=>[SVR8-PRT2]=>[SVR3-PRT1]" (path 3).

All Monitoring Paths

FIG. 8 is a diagram illustrating an example of a monitoring path table, according to an embodiment, which is, for example, stored as the monitoring path table T2 in a monitoring path storage area R2 of the storage 102 in FIG. 3 and FIG. 5. The monitoring path storage area R2 is an area for storing the monitoring path table T2. A state in which the monitoring path table T2 is stored in the monitoring path storage area R2 is schematically indicated by ": T2" in the storage 102 of FIG. 3 and FIG. 5. The monitoring path table T2 is a table storing all possible monitoring paths.

The monitoring path table T2 includes a monitoring target field, a monitoring target IP address field, and a monitoring path field. The monitoring target field stores an ID of a host server or a virtual machine, which is set as a monitoring target by the management apparatus M1. The monitoring target IP address field stores an IP address set to a host server or a virtual machine, which is a target to be monitored by the management apparatus M1. Meanwhile, IDs of virtual machines correspond to the IDs of the first virtual machine VM1 to the n-th virtual machine VMn in FIG. 1.

The monitoring path field stores monitoring paths between the management apparatus M1 and the monitoring target.

The monitoring path table T2 stores, in each of rows, an ID of a monitoring target which is a target to be monitored, an IP address set to a host server or a virtual machine which is a target to be monitored, and monitoring paths between the management apparatus M1 and the monitoring target, in association with each other.

For example, the monitoring path table T2 stores an ID "SVR1" of a first host server SVR1, an IP address "192.168.1.10" which is set to the first host server SVR1, and the monitoring paths between the management apparatus M1 and the first host server SVR1, in association with each other.

A monitoring path between the management apparatus M1 and the first host server SVR1 is indicated as, for example, "[M1]=>[SW1-PRT1]=>[SW1-PRT2]=>[SW2-PRT3]=>[SW2-PRT1]=>[SW5-PRT2]=>[SW5-PRT1]=>[SVR1-PRT1]" (path 4). "M1" of [M1] indicates an ID of the management apparatus M1 and corresponds to the symbol of the management apparatus M1 in FIG. 1.

The path 4 indicates a network path passing through the port of the management apparatus M1, the port 1 of the first switch SW1, the port 2 of the first switch SW1, the port 3 of the second switch SW2, the port 1 of the second switch SW2, the port 2 of the fifth switch SW5, the port 1 of the fifth switch SW5, and the port 1 of the first host server SVR1. In the case, the (path 4) indicates that the transmission and reception of the communication packet are performed between the management apparatus M1 and the first host server SVR1 via the network path.

In addition, a monitoring path between the management apparatus M1 and the first host server SVR1 is indicated by, for example, "[M1]=>[SW1-PRT1]=>[SW1-PRT3]=>[SW3-PRT1]=>[SW3-PRT2]=>[SW6-PRT3]=>[SW6-PRT1]=>[SVR1-PRT2]" (path 5).

Further, a monitoring path between the management apparatus M1 and the first host server SVR1 is indicated as, for example, "[M1]=>[SW1-PRT1]=>[SW1-PRT4]=>[SW4-PRT4]=>[SW4-PRT3]=>[SW6-PRT4]=>[SW6-PRT1]=>[SVR1-PRT2]" (path 6).

There may be an additional monitoring path between the management apparatus M1 and the first host server SVR1, but the description thereof will not be made here.

In addition, for example, the monitoring path table T2 stores an ID "VM1" of the first virtual machine VM1, an IP address "192.168.1.13" which is set to the first virtual machine VM1, and monitoring paths between the management apparatus M1 and the first virtual machine VM1, in association with each other.

A monitoring path between the management apparatus M1 and the first virtual machine VM1 is indicated by, for example, "[M1]=>[SW1-PRT1]=>[SW1-PRT2]=>[SW2-PRT3]=>[SW2-PRT1]=>[SW5-PRT2]=>[SW5-PRT1]=>[VM1-PRT1]" (path 7). "VMn" of [VMn] indicates the ID of the n-th virtual machine VMn.

In addition, a monitoring path between the management apparatus M1 and the first virtual machine VM1 is indicated by, for example, "[M1]=>[SW1-PRT1]=>[SW1-PRT3]=>[SW3-PRT1]=>[SW3-PRT2]=>[SW6-PRT3]=>[SW6-PRT1]=>[VM1-PRT2]" (path 8). Here, the port 2 of the first virtual machine VM1 is the same as the port 2 of the first host server SVR1 which executes the first virtual machine VM1.

In addition, a monitoring path between the management apparatus M1 and the first virtual machine VM1 is indicated by, for example, "[M1]=>[SW1-PRT1]=>[SW1-PRT4]=>[SW4-PRT4]=>[SW4-PRT3]=>[SW6-PRT4]=>[SW6-PRT1]=>[VM1-PRT2]" (path 9). There may be an additional monitoring path between the management apparatus M1 and the first host server SVR1, and the description thereof will not be made here.

All Migration Paths and all Monitoring Paths

The management module 11 of the management apparatus M1 acquires connection information stored in each switch from the respective switches (SW1 to SW8) which configure the information processing system SYS, at the time of activation or periodically after the activation, and then stores the acquired connection information in the storage 102.

The above-described connection information is information indicating the connection relationship between the switch and other devices, such as the switch, the management apparatus M1, and the host server. For example, the first switch SW1 in FIG. 1 is connected to the management apparatus M1 via the port 1, and is connected to the port 3 of the second switch SW2 via the port 2. Further, the first switch SW1 is connected to the port 1 of the third switch SW3 via the port 3, and is connected to the port 4 of the fourth switch SW4 via the port 4. The first switch SW1 stores connection information indicating the connection relationship between the management apparatus M1, the second switch SW2, the third switch SW3, and the fourth switch SW4.

Then, the management module 11 generates network topology information of the entire information processing system SYS based on the acquired connection information, and stores the generated information in the storage 102.

The management module 11 calculates migration paths which are assumable between the source host server SRC and the destination host server DST, as illustrated in FIG. 7, by referring to the network topology information of the entire information processing system SYS. Then, the management module 11 creates the migration path table T1 indicating the result of the above calculation and stores the created migration path table T1 in the storage 102 of FIG. 3 and FIG. 5.

In the same way, the management module 11 calculates the monitoring paths which are assumable between the management apparatus M1, the host server of the monitoring target, and the virtual machine, as illustrated in FIG. 8, by referring to the network topology information of the entire information processing system SYS. Then, the management module 11 creates the monitoring path table T2 indicating the result of the above calculation and stores the created monitoring path table T2 in the storage 102 of FIG. 3 and FIG. 5.

Packet Transfer Table

FIG. 9 is a diagram illustrating an example of a transfer path table, according to an embodiment, which is, for example, stored as the transfer path table T3 in a transfer path storage area R3 of the storage 102 in FIG. 3 and FIG. 5. The transfer path storage area R3 is an area for storing the transfer path table T3. A state in which the transfer path table T3 is stored in the transfer path storage area R3 is schematically indicated by ": T3" in the storage 102 of FIG. 3 and FIG. 5.

The transfer path table T3 stores information on a path of a communication packet which is actually transferred in the network of the information processing system SYS. In other words, the transfer path table T3 stores information on a migration path which is actually executed and a monitoring path which is actually executed.

The transfer path table T3 includes a switch field, a reception port field, a destination IP address field, and a transmission port field.

The switch field stores an ID of the switch. The ID of the switch corresponds to a symbol of each of switches (first switch SW1 to eighth switch SW8) in FIG. 1. The reception port field stores an ID of a port which receives a communication packet (hereinafter, appropriately referred to as a reception port). The destination IP address field stores a destination IP address. The transmission port field stores an ID of a transmission port for transmitting the received communication packet.

The transfer path table T3 stores, in each of rows, an ID of a switch, an ID of a reception port of the switch, a destination IP address included in a communication packet which is received via the reception port identified by the ID thereof, and an ID of a transmission port which transmits the communication packet, in association with each other.

According to the transfer path table T3, as indicated by the symbol LN21, the fifth switch SW5 receives a communication packet including "192.168.1.12" (hereinafter, referred to as a communication packet MGRT) via the port 1 (a reception port 1), and transmits the communication packet to the port 2 (a transmission port 2). In the case, the IP address "192.168.1.12" is an IP address which is set to the third host server SVR3.

As indicated by the symbol LN22, the second switch SW2 receives a communication packet MGRT via the port 1 (the reception port 1), and transmits the communication packet MGRT to the port 2 (the transmission port 2).

As indicated by the symbol LN23, the eighth switch SW8 receives a communication packet MGRT via the port 1 (the reception port 1), and transmits the communication packet MGRT to the port 2 (the transmission port 2). The communication packet MGRT which is transmitted to the transmission port 2 of the eighth switch SW8 reaches the third host server SVR3.

The delay-causing path specifying module 12 of the management apparatus M1 specifies an actual migration path based on the transfer path table T3 of FIG. 9. Further, the monitoring path specifying module 13 of the management apparatus M1 specifies an actual monitoring path based on the transfer path table T3 of FIG. 9.

The management module 11 of the management apparatus M1 acquires a packet transfer table (refer to FIG. 2) stored in a switch, from the switch. The packet transfer table in FIG. 2 is an example of communication information indicating a destination of data corresponding to a second communication (for example, the communication for migration).

The management module 11 creates a transfer path table T3, based on network topology information (which is indicated as path information in FIG. 7 and FIG. 8) and a packet transfer table (refer to FIG. 2) stored in each switch.

A method of creating the transfer path table T3 will be described. For example, the second switch SW2 receives the communication packet including the destination IP address "192.168.1.12" via the port 1 (the reception port 1), and stores the packet transfer table including the information indicating that the communication packet is transmitted to the port 2 (the transmission port 2).

The network topology information (which is indicated as path information in FIG. 7 and FIG. 8) includes connection information indicating that the second switch SW2 is connected to the port 2 of the fifth switch SW5 via the port 1, and the second switch SW2 is connected to the port 1 of the eighth switch SW8 via the port 2.

The management module 11 stores information, which indicates that the second switch SW2 receives a communication packet MGRT via the port 1 and transmits the communication packet MGRT to the port 2 (the transmission port 2), in the transfer path table T3 (refer to the row LN22), based on the packet transfer table and the network topology information.

As described above, the management module 11 of the management apparatus M1 calculates a network path on which a communication packet is actually transferred, and stores a result of the calculation in the transfer path table T3, based on the network topology information and the packet transfer table stored in each switch.

Then, the delay-causing path specifying module 12 specifies a path of communication which causes a communication delay in the monitoring path, based on the transfer path table T3.

Information on a Server Under Management

FIG. 10 is a diagram illustrating an example of a management server information table, according to an embodiment, which is, for example, stored as the management server information table T4 in a management server information storage area R4 of the storage 102 in FIG. 3 and FIG. 5. The management server information storage area R4 is an area for storing the management server information table T4. A state in which the management server information table T4 is stored in the management server information storage area R4 is schematically indicated by ": T4" in the storage 102 of FIG. 3 and FIG. 5.

The management server information table T4 stores information relating to servers which are management targets of the management apparatus M1, where a monitoring target is included in the management targets.

The management server information table T4 includes a management target field, a type field, an IP address field, a MAC address field, a VM-operating host field, and an image size field, where "MAC" is an abbreviation of "media access control address".

The management target field stores an ID of a host server managed by the management apparatus M1 or a virtual machine. The type field stores an ID for identifying whether the management target is a physical machine or a virtual machine, that is, the type of the management target. In a case where the management target is a physical machine, an ID "VMHost" is stored in the type field; and in a case where the management target is the virtual machine, ID "VMGuest" is stored in the type field.

The IP address field stores an IP address which is set to a management target. The MAC address field stores a MAC address which is set to the management target. In a case where the management target is a virtual machine, the VM-operating host field stores an ID of a physical machine (a host server) which causes the virtual machine to operate; and in a case where the management target is a virtual machine, the image size field stores an image size (the unit is gigabyte (GB)) of the virtual machine.

The management server information table T4 stores, in each of rows, an ID of an management target, a type of the management target, an IP address which is set to the management target, and a MAC address which is set to the management target, in association with each other. In a case where a management target is a virtual machine, the management server information table T4 further stores, in the each row described above, an ID of a host server which causes the virtual machine of the management target to operate, and an image size of the virtual machine of the management target, in association with each other.

The management apparatus M1, by referring to the management server information table T4, recognizes that the type of the first virtual machine VM1 is, for example, a VMGuest, the IP address which is set to the first virtual machine VM1 is "192.168.1.13", and the MAC address which is set to the first virtual machine VM1 is "60: 1B: 32: F2: FE: 43". Further, referring to the management server information table T4, the management apparatus M1 recognizes that the host server which causes the first virtual machine VM1 to operate is the first host server SVR1, and the image size of the first virtual machine VM1 is 30 GB.

The management module 11 creates a management server information table T4 for a host server by using a configuration management database (not illustrated) which is provided in the information processing system SYS. The configuration management database is also called a configuration management database (CMDB). The configuration management database stores information on the host server (the IP address, the MAC address, or the like), and information on the virtual machine executed by the host server (the IP address, the MAC address, the image size, or the like).

The management module 11, for example, periodically makes an inquiry of the host server about an ID, an IP address, a MAC address, and an image size of the virtual machine being operated. The host server executes software for managing the virtual machine (also referred to as a hypervisor). The hypervisor of the host server manages the ID, the IP address, the MAC address, and the image size of the virtual machine being operated.

Upon receiving an inquiry from the management module 11 of the management apparatus M1, the hypervisor of the host server transmits the ID, the IP address, the MAC address, and the image size of the virtual machine being operated, which are stored in the host server, to the management apparatus M1.

Meanwhile, the administrator of the information processing system SYS may create the management server information table T4.

Monitoring Interval

FIG. 11 is a diagram illustrating an example of a monitoring timing table, according to an embodiment, which is, for example, stored as the monitoring timing table T5 in a monitoring timing information storage area R5 of the storage 102 in FIG. 3 and FIG. 5. The monitoring timing information storage area R5 is an area for storing monitoring timing table T5. A state in which the monitoring timing table T5 is stored in the monitoring timing information storage area R5 is schematically indicated by ": T5" in the storage 102 of FIG. 3 and FIG. 5.

The monitoring timing table T5 stores an interval for monitoring a virtual machine of a monitoring target.

The monitoring timing table T5 includes a monitoring target field and a monitoring interval field. The monitoring target field stores an ID of a virtual machine of the monitoring target. The monitoring interval field stores an interval of the monitoring timing in which the information relating to a state of the virtual machine is acquired from the host server which causes the virtual machine of the monitoring target to operate.

The monitoring timing table T5 stores, in each of rows, an ID of a monitoring target in association with a monitoring interval of the monitoring target. According to the monitoring timing table T5, for example, the monitoring interval of the first virtual machine VM1 is five minutes, that is, the management apparatus M1 executes monitoring of the first virtual machine VM1 at five minutes interval.

For example, the administrator of the information processing system SYS creates the monitoring timing table T5, and stores the created monitoring timing table T5 in the monitoring timing information storage area R5 of the storage 102 in FIG. 3 and FIG. 5.

Monitoring History

FIG. 12 is a diagram illustrating an example of a monitoring history table, according to an embodiment, which is, for example, stored as the monitoring history table T6 in a monitoring history information storage area R6 of the storage 102 in FIG. 3 and FIG. 5. The monitoring history information storage area R6 is an area for storing the monitoring history table T6. A state in which the monitoring history table T6 is stored in the monitoring history information storage area R6 is schematically indicated by ": T6" in the storage 102 of FIG. 3 and FIG. 5.

The monitoring history table T6 stores a monitoring time at which the management apparatus M1 has lastly executed the monitoring of the virtual machine.

The monitoring history table T6 includes a monitoring target field and a monitoring time field. The monitoring target field stores an ID of the virtual machine of the monitoring target. The monitoring time field stores a time at which the management module 11 of the management apparatus M1 has lastly executed the monitoring of the virtual machine. Meanwhile, the monitoring time may be indicated by YYYY/MM/DD/HH.

The monitoring history table T6 stores, in each of rows, an ID of a monitoring target (a virtual machine) in association with a monitoring time at which the management module 11 of the management apparatus M1 has lastly executed the monitoring of the virtual machine.

When executing the monitoring of the virtual machine of the monitoring target, the management module 11 of the management apparatus M1 stores the ID of the virtual machine in association with the time at which the monitoring is executed in the monitoring history table T6.

Service Level

FIG. 13 is a diagram illustrating an example of a service level table, according to an embodiment, which is, for example, stored as the service level table T7 in a service level storage area R7 of the storage 102 in FIG. 3 and FIG. 5. The service level storage area R7 is an area for storing the service level table T7. A state in which the service level table T7 is stored in the service level storage area R7 is schematically indicated by ": T7" in the storage 102 of FIG. 3 and FIG. 5.

The service level table T7 stores a service level which is guaranteed to each tenant by the business operator of the information processing system SYS. In detail, the service level table T7 stores, for each of the plurality of monitoring targets, a service level indicating information on a time period during which a normal operation is required within a predetermined time period (for example, for one year), where the time period is defined for each target. In the example of FIG. 13, the service level table T7 stores a service level indicating a ratio of a time period during which a normal operation is required, to a predetermined time period.

The service level table T7 includes a tenant name field, a monitoring target field, and a service level field. The tenant name field stores the name of the tenant. The monitoring target field stores an ID of a virtual machine which is provided for the tenant. The virtual machine is a virtual machine to be monitored. The service level field stores a service level which is guaranteed to each tenant by the business operator of the information processing system SYS.

The service level table T7 stores, in each of rows, a tenant name, an ID of a monitoring target (a virtual machine), and a service level which is guaranteed to a tenant of the tenant name, in association with each other.

The administrator of the information processing system SYS stores a service level which is guaranteed to each tenant, in the storage 102 of FIG. 3 and FIG. 5. When a virtual machine to be provided for a tenant is activated by the host server, the management apparatus M1 stores, in the service level table T7, an ID of the tenant (for example, the name of the tenant), an ID of the activated virtual machine, and a service level of the tenant in association with each other. That is, the service level table T7 stores a service level which is guaranteed to the virtual machine provided for the tenant (in other words, a service level defined for the virtual machine).

Information of Switch Under Management

FIG. 14 is a diagram illustrating an example of a switch table, according to an embodiment, which is, for example, stored as the switch table T8 in a management switch information storage area R8 of the storage 102 in FIG. 3 and FIG. 5. The management switch information storage area R8 is an area for storing the switch table T8. A state in which the switch table T8 is stored in the management switch information storage area R8 is schematically indicated by ": T8" in the storage 102 of FIG. 3 and FIG. 5.

The switch table T8 stores information on a switch which is managed by the management apparatus M1. The switch table T8 stores, for example, communication bandwidth information relating to a communication delay of the monitoring communication.

The switch table T8 includes a switch field, an IP address field, a MAC address field, a port field, a bandwidth (abbreviated as BW in FIG. 14) field, and a status field.

The switch field stores an ID of a switch which is managed by the management apparatus M1. The IP address field stores an IP address which is set to the switch. The MAC address field stores a MAC address which is set to the switch. The port field stores an ID of a port of the switch. The bandwidth field stores a bandwidth of the port (the unit is Gbps). The status field stores a status of the port.

The switch table T8 stores, in each of rows, an ID of a switch, an IP address which is set to the switch, and a MAC address which is set to the switch, in association with each other. Further, the switch table T8 stores, in each of sub-rows included in the each row associated with the switch, an ID of a port of the switch, a bandwidth of the port, and a status of the port, in association with each other.

The management apparatus M1, by referring to the switch table T8, recognizes, for example, that an IP address which is set to the first switch SW1 is "192.168.1.100", and a MAC address which is set to the first switch SW1 is "00: 1E: 68: 85: F8: DD". Further, by referring to the switch table T8, the management apparatus M1 recognizes that bandwidths of the port 1 to the port 4 of the first switch SW1 is each 10 Gbps, and statuses of the ports 1 to 3 are each "normal" and a status of the port 4 is "lack of the bandwidth (BW)".

The management apparatus M1 stores, in the switch table T8, an ID of a switch of a management target, an IP address which is set to the switch, and a MAC address, in association with each other. Then, the management apparatus M1 periodically makes an inquiry of the switch about bandwidths and statuses of ports of the switch. The management apparatus M1 stores, in the switch table T8, the bandwidths and the statuses of the ports of the switch acquired from the switch, in association with the ID of the switch.

Migration Execution History

FIG. 15 is a diagram illustrating an example of a migration execution history table, according to an embodiment, which is, for example, stored as the migration execution history table T9 in a migration history storage area R9 of the storage 102 in FIG. 3 and FIG. 5. The migration history storage area R9 is an area for storing the migration execution history table T9. A state in which the migration execution history table T9 is stored in the migration history storage area R9 is schematically indicated by ": T9" in the storage 102 of FIG. 3 and FIG. 5.

The migration execution history table T9 is a table for storing, for example, a communication time from the start of a communication to the end of the communication for each of a plurality of communications in the past corresponding to the communication for migration, and an amount of data transmitted in each of the plurality of communications in the past. In other words, the migration execution history table T9 stores an actually spent time from the start of a migration of the virtual machine to the end thereof (hereinafter, appropriately referred to as an actual communication time), and a size of an image of the virtual machine (hereinafter, appropriately referred to as an image size).

The migration execution history table T9 includes a virtual machine field, an image size field, and an actual communication time field. The virtual machine field stores an ID of a virtual machine in which a migration is executed. The image size field stores an image size of the virtual machine. The actual communication time field stores an actual communication time spent for the migration of the virtual machine.

The migration execution history table T9 stores, in each of rows, an ID of a virtual machine, an image size of a virtual machine, an actual communication time for a migration of the virtual machine, in association with each other.

The management module 11 of the management apparatus M1, for example, periodically makes an inquiry of a host server operating a virtual machine, about an image size of the virtual machine and an actual communication time for a migration of the virtual machine. The hypervisor of the host server manages the image size of the virtual machine, controls execution of the migration of the virtual machine, and then stores the actual migration time of the migration.

Upon receiving an inquiry from the management module 11 of the management apparatus M1, the hypervisor of the host server transmits the ID of the virtual machine, the image size of the virtual machine, and the actual communication time of the virtual machine, which are stored therein, to the management apparatus M1.

Meanwhile, upon completion of the migration of the virtual machine, the hypervisor of the host server may transmit the ID of the virtual machine, the image size of the virtual machine, and the actual communication time of the virtual machine to the management apparatus M1.

Upon receiving an ID of a virtual machine, an image size of the virtual machine, and an actual communication time of the virtual machine, the management module 11 of the management apparatus M1 stores, in the migration execution history table T9, the ID, the image size, and the actual communication time, in association with each other.

Information Table for Detecting Delay

Next, a delay-detecting information table (also called a TCP or IP port table) which is stored in a switch SW will be described. FIG. 16 is a diagram illustrating an example of a delay-detecting information table, according to an embodiment, which is, for example, stored as the delay-detecting information table T11 in a delay-detecting information storage area R11 of the storage 302 in FIG. 4 and FIG. 6. The delay-detecting information storage area R11 is an area for storing the delay-detecting information table T11. A state in which the delay-detecting information table T11 is stored in the delay-detecting information storage area R11 is schematically indicated by ": T11" in the storage 302 of FIG. 4 and FIG. 6.

A delay-detecting information table of FIG. 16 is a table which is referred by a switch when the switch detects a communication causing a delay in the monitoring communication, for example, a communication of a migration.

The delay-detecting information table T11 includes a port name field, a protocol field, and a communication type field. The port name field stores a port number. The protocol field stores information identifying a communication protocol which is applied to a communication process of a communication packet including the port number as a source port number or a destination port number. The communication protocol is a TCP or a user datagram protocol (UDP). The type field stores information identifying a service associated with the port number.

The delay-detecting information table T11 stores, in each of rows, a port name (for example, 902), a protocol (for example, a TCP or a UDP), and a type (for example, an migration), in association with each other.

The administrator of the information processing system SYS stores the delay-detecting information table T11 in advance in the delay-detecting information storage area R11 of the storage 302 of each switch.

Switch Process

Figure 17:
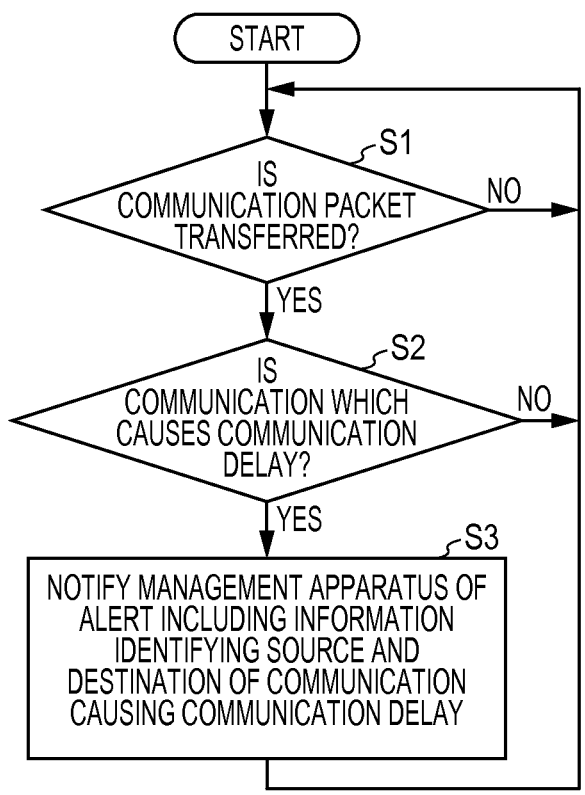
FIG. 17 is a diagram illustrating an example of an operational flowchart for a process of a switch, according to an embodiment.

A process of the switch will be described with reference to FIG. 16 and FIG. 17. FIG. 17 is a diagram illustrating an example of an operational flowchart for a process of a switch, according to an embodiment. In the description for the following operational flowcharts, Ss (a small letter s denotes an integer of 1 or more) represents step Ss, and step Ss will be appropriately abbreviated as Ss.

Before describing FIG. 17, it is assumed that a migration for moving a n-th virtual machine VMn from a first host server SVR1 to a third host server SVR3 is started.

S1: A delay-causing communication detecting module 32 of the switch SW determines whether or not the management module 31 receives a communication packet and transfers the communication packet to other switches. In a case where the management module 31 transfers the communication packet (YES in S1), the process proceeds to S2. In a case where the management module 31 does not transfer the communication packet (NO in S1), the process returns to S1.

S2: The delay-causing communication detecting module 32 of the switch SW determines whether or not a communication causing a communication delay in the monitoring path is executed, by checking the transferred communication packet. Specifically, the delay-causing communication detecting module 32 determines whether or not the destination port number of the transferred communication packet is matched with the port number stored in the port name field of the delay-detecting information table T11 in FIG. 16. In the example of FIG. 16, the delay-causing communication detecting module 32 determines whether or not the destination port number of the transferred communication packet is matched with the port number "902".

In a case where both port numbers are matched to each other, the delay-causing communication detecting module 32 determines that the communication causing the communication delay of the monitoring communication is executed (YES in S2). In the communication of the communication delay of the monitoring communication is executed (YES in S2), the process proceeds to S3. In a case where the communication of the communication delay of the monitoring communication is not executed (NO in S2), the process proceeds returns to S2.

S3: The communicating module 33 of the switch SW notifies the management apparatus M1 of an alert including information identifying the communication destination and the communication source of the communication causing the communication delay of the monitoring communication.

The alert indicates that the communication causing the communication delay of the monitoring communication is executed, and includes the destination IP address and the source IP address which are included in the communication packet of the communication causing the communication delay of the monitoring communication. In the example of FIG. 16, the information is the destination IP address and the source IP address which are included in the communication packet including the destination port number "902".

Meanwhile, the switch SW may broadcast this alert to other switches. Upon receiving the alert, the other switches do not notify the management apparatus M1 of the alert even though the other switches receive the communication packet including the destination port number, the destination IP address, and the source IP address which are included in the alert. This prevents the management apparatus M1 from being notified about the same content of the alert from the plurality of switches.

Change of Monitoring Path

Figure 18:
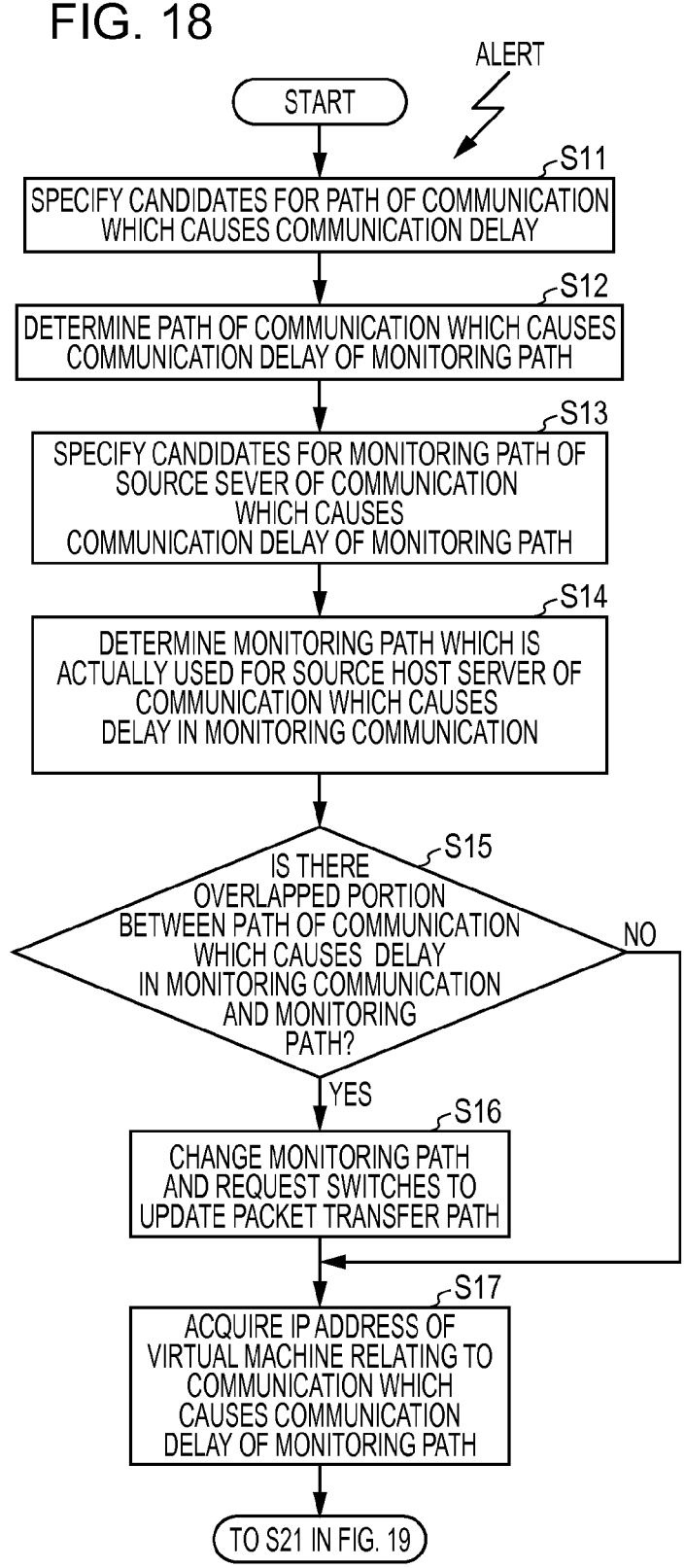
FIG. 18 is a diagram illustrating an example of an operational flowchart for a process of changing a monitoring path, according to an embodiment.
Figure 19:
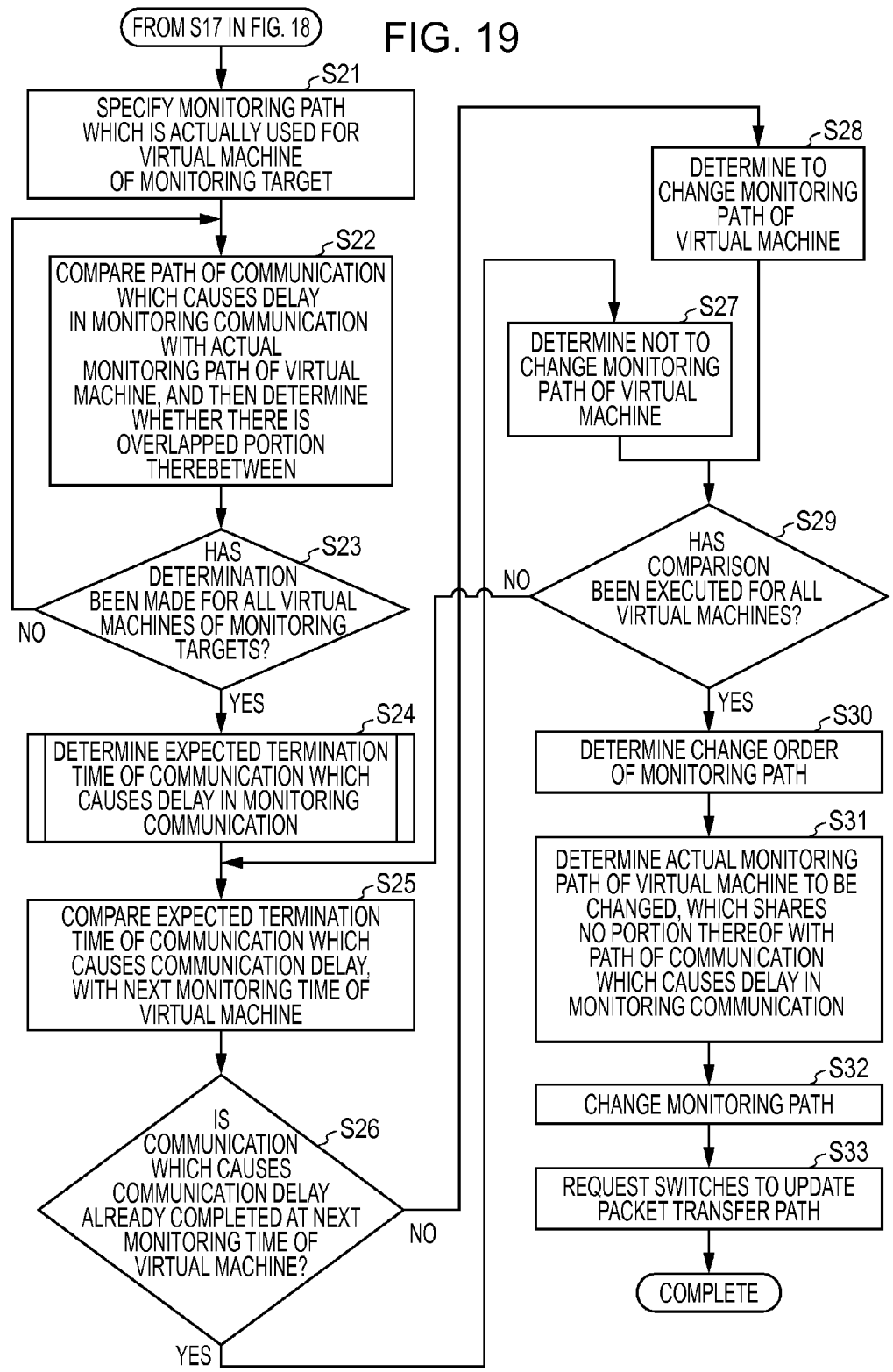
FIG. 19 is a diagram illustrating an example of an operational flowchart for a process of changing a monitoring path, according to an embodiment.
Figure 20:
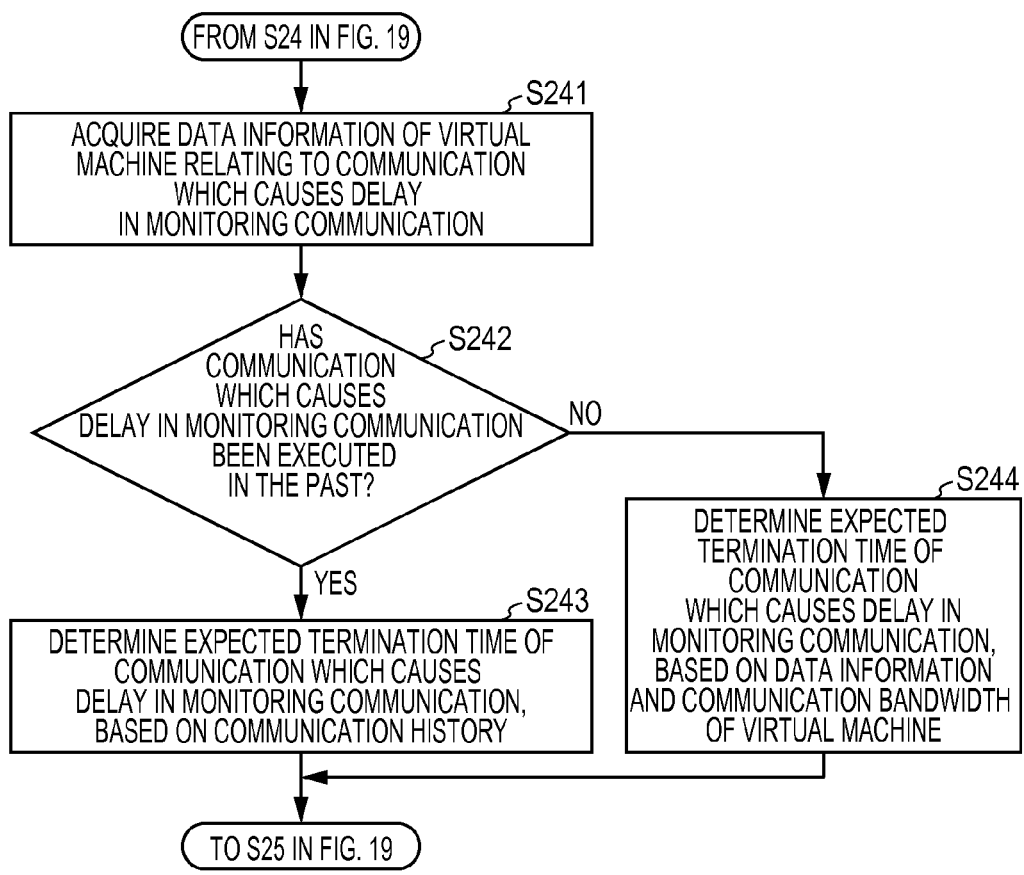
FIG. 20 is a diagram illustrating an example of an operational flowchart for a process of changing a monitoring path, according to an embodiment.

The process of changing the monitoring path, which is executed by the management apparatus M1 will be described with reference to FIG. 18 to FIG. 22. FIG. 18 to FIG. 20 correspond to the first to third flowcharts illustrating a process of changing the monitoring path which is executed by the management apparatus M1 in FIG. 1.

FIG. 21 is a diagram illustrating an example of a packet transfer path table, according to an embodiment, which is changed, for example, in a first switch SW1. FIG. 22 is a diagram illustrating an example of a changed transfer path table, according to an embodiment, which is, for example, the changed transfer path table T3 in FIG. 9.

The management module 11 of the management apparatus M1 acquires a state of the virtual machine of the monitoring target, at a predetermined monitoring timing, by accessing the virtual machine of the monitoring target indicated by the management server information table T4 in FIG. 10. Then, the management module 11 stores an ID of the virtual machine of the monitoring target in the monitoring target field of the monitoring history table T6, and stores a monitoring time (for example, a time at which the state is acquired) in the monitoring time field.

Upon receiving an alert from the switch, the management module 11 outputs the received alert to the delay-causing path specifying module 12 and the monitoring path specifying module 13.

Step S11 in FIG. 18

S11: Upon receiving an alert, the delay-causing path specifying module 12 specifies candidates for a path of a communication which causes a delay in the monitoring communication. For example, the communication which causes a delay in the monitoring communication is a communication for migration as illustrated in FIG. 1. The communication for migration is a communication between the first host server SVR1 and the third host server SVR3. In the migration, the candidates for the path of the communication causing the communication delay are all the network paths between the first host server SVR1 and the third host server SVR3.

Specifically, the delay-causing path specifying module 12 specifies, from among all the rows in the migration path table T1 in FIG. 7, rows each storing a source IP address included in the alert in the migration source IP address field, and storing a destination IP address included in the alert in the migration destination IP address field.

In a case where the source IP address included in the alert is "192.168.1.10", and the destination IP address included in this alert is "192.168.1.12", the delay-causing path specifying module 12 specifies a row LN1.

The delay-causing path specifying module 12 extracts migration paths which are stored in a cell of the migration path table T1, at which the specified row and a column of the migration path field are intersected with each other. In the above-described example, the delay-causing path specifying module 12 extracts migration paths of the path 2, the path 3, etc.

Step S12 in FIG. 18

S12: The delay-causing path specifying module 12 determines a path of a communication which causes a delay in the monitoring communication. Specifically, the delay-causing path specifying module 12 determines a path of the migration which is actually executed. The delay-causing path specifying module 12 determines a migration path which is actually executed, based on the destination IP address included in the alert, the migration paths extracted in S11, and the transfer path table T3 in FIG. 9.

In the above-described example, the destination IP address included in the alert is "192.168.1.12". The delay-causing path specifying module 12 specifies all the rows that include the destination IP address "192.168.1.12" (the LN21 and the LN22) in the destination IP address field of the transfer path table T3 in FIG. 9. The delay-causing path specifying module 12 specifies IDs of the switches (the SW5, the SW2, and the SW8) included in the specified rows.

The delay-causing path specifying module 12 determines a path passing through all the switches identified by the specified IDs, from the migration paths of the path 2, the path 3, etc, which are extracted in S11. In other words, the delay-causing path specifying module 12 determines a migration path including all the specified IDs, from among the migration paths which are extracted in S11.

In the above-described example, the path 2 "[SVR1–PRT1]=>[SW5–PRT1]=>[SW5–PRT2]=>[SW2–PRT1]=>[SW2–PRT2]=>[SW8–PRT1]=>[SW8–PRT2]=>[SVR3–PRT1]" includes all the IDs of the specified switches (the SW5, the SW2, and the SW8). Accordingly, the delay-causing path specifying module 12 determines the path 2.

Then, the delay-causing path specifying module 12 determines whether or not the connection relationships between the ports in the determined path of the path 2 satisfies all the relationships between the reception ports and the transmission ports in the specified rows (the LN21 and the LN22).

According to the row LN21, the communication packet (the communication packet MGRT) including "192.168.1.12" is received in the fifth switch SW5 via the reception port 1, and then is transmitted to the transmission port 2. The relationship between the reception port and the transmission port satisfies "[SW5–PRT1]=>[SW5–PRT2]=>" of the path 2.

According to the row LN22, the communication packet MGRT is received in the second switch SW2 via the reception port 1, and then is transmitted to the transmission port 2. The relationship between the reception port and the transmission port satisfies "[SW2–PRT1]=>[SW2–PRT2]=>" of the path 2.

According to the row LN23, the communication packet MGRT is received in the eighth switch SW8 via the reception port 1, and then transmitted to the transmission port 2. The relationship between the reception port and the transmission port satisfies "[SW8–PRT1]=>[SW8–PRT2]=>" of the path 2.

As described above, the delay-causing path specifying module 12 determines that the connection relationships between the ports in the specified path of the path 2 satisfies all the relationships between the reception ports and the transmission ports in the specified rows (the LN21 and the LN22). Then, the delay-causing path specifying module 12 determines the path 2 as the migration path which is actually executed.

Step S13 in FIG. 18

S13: The monitoring path specifying module 13 specifies candidates for a monitoring path of the communication source server (the source host server SRC) of the communication which causes the communication delay. In the above-described example, the source host server SRC is the first host server SVR1. In the case, the candidates for the monitoring path are all the network paths between the management apparatus M1 and the first host server SVR1.

Specifically, the monitoring path specifying module 13 specifies, from all the rows of the monitoring path table T2 in FIG. 8, rows each storing the source IP address included in the alert in the monitoring target IP address field.

In a case where the source IP address included in the alert is "192.168.1.10", the monitoring path specifying module 13 specifies a row LN41.

The monitoring path specifying module 13 extracts monitoring paths which are stored in a cell in the monitoring path table T2, at which the specified rows and a column of the monitoring path field are intersected with each other. In the above-described example, the delay-causing path specifying module 12 extracts the monitoring paths of the path 4 to the path 6, etc.

Step S14 in FIG. 18

S14: The monitoring path specifying module 13 determines a path of monitoring which is actually executed for the communication source host server (the source host server SRC) of the communication which causes a delay in the monitoring communication. The monitoring path specifying module 13 determines a monitoring path via which monitoring is actually executed, based on the source IP address included in the alert, the monitoring paths extracted in S13, and the transfer path table T3 in FIG. 9.

In the above-described example, the source IP address included in the alert is "192.168.1.10". The monitoring path specifying module 13 specifies all the rows storing the source IP address "192.168.1.10" (the LN24 to the LN26) in the destination IP address field of the transfer path table T3 in FIG. 9. The monitoring path specifying module 13 specifies the IDs of the switches (the SW1, the SW2, and the SW5) included in the specified rows.

The monitoring path specifying module 13 determines a path passing through all the switches identified by the specified IDs, from among the monitoring paths of the path 4 to the path 6, etc, which are extracted in S13. In other words, the monitoring path specifying module 13 determines a monitoring path including all the specified IDs, from among the monitoring paths which are extracted in S13.

In the above-described example, the path 4 of "[M1]=>[SW1-PRT1]=>[SW1-PRT2]=>[SW2-PRT3]=>[SW2-PRT1]=>[SW5-PRT2]=>[SW5-PRT1]=>[SVR1-PRT1]" includes all the IDs of the specified switches (the SW1, the SW2, and the SW5). Accordingly, the monitoring path specifying module 13 determines the path 4.

Then, the monitoring path specifying module 13 determines whether or not the connection relationships between the ports in the determined path (the path 4) satisfies all the relationships between the reception ports and the transmission ports in the specified rows (the LN24 to the LN26).

According to the row LN24, a communication packet (hereinafter, refer to a communication packet WT1) including "192.168.1.10" is received in the first switch SW1 via the reception port 1, and then is transmitted to the transmission port 2. The relationship between the reception port and the transmission port satisfies "[SW1-PRT1]=>[SW1-PRT2]=>" of the path 4.

According to the row LN25, the communication packet WT1 is received in the second switch SW2 via the reception port 3, and then is transmitted to the transmission port 1. The relationship between the reception port and the transmission port satisfies "[SW2-PRT3]=>[SW2-PRT1]=>" of the path 4.

According to the row LN26, the communication packet WT1 is received in the fifth switch SW5 via the reception port 2, and then is transmitted to the transmission port 1. The relationship between the reception port and the transmission port satisfies "[SW5-PRT2]=>[SW5-PRT1]" of the path 4.

As described above, the monitoring path specifying module 13 determines that the connection relationships between the ports in the specified path of the path 4 satisfies all the relationships between the reception ports and the transmission ports in the specified rows (the LN24 to the LN26). Then, the monitoring path specifying module 13 determines the path 4 as the monitoring path which is actually executed for the source host server SRC.

Step S15 in FIG. 18

S15: The monitoring path change determination module 17 compares a path of the communication, which causes a delay in the monitoring communication, determined in S12 with a monitoring path which is determined in S14, and then determines whether or not there is an overlapped portion therebetween. When there is an overlapped portion therebetween (YES in S15), the process proceeds to S16. When there is no overlapped portion therebetween (NO in S15), the process proceeds to S17.

In the above-described example, the migration path (the path 2) determined in S12 and the monitoring path (the path 4) determined in S14 share a path between the port 1 of the second switch SW2 and the port 2 of the fifth switch SW5 (refer to N6 in FIG. 1) and a path between the port 1 of the fifth switch SW5 and the port 1 of the first host server SVR1 (refer to N5 in FIG. 1).

Step S16 in FIG. 18

S16: The alternative monitoring path specifying module 19 determines a monitoring path of the communication source server for the communication which causes a communication delay so that the monitoring path shares no portion thereof with a path of the communication specified in S12, which causes the communication delay in the monitoring communication.

Then, the transfer path updating module 20 requests the switches to change the packet transfer paths thereof. In the case, the communication source server is the source host server SRC.

In the above-described example, the alternative monitoring path specifying module 19 determines a non-overlapping path that shares no portion thereof with the migration path determined in S12, from among the paths extracted in S13, that is, the path 4 to the path 6, etc.

The non-overlapping path may be, for example, the path 5. The path 5 is "[M1]=>[SW1-PRT1]=>[SW1-PRT3]=>[SW3-PRT1]=>[SW3-PRT2]=>[SW6-PRT3]=>[SW6-PRT1]=>[SVR1-PRT2]".

The transfer path updating module 20 requests the switches configuring the monitoring path determined in S16 to change the packet transfer paths thereof.

In the above-described example, the transfer path updating module 20 requests the first switch SW1 to change the packet transfer paths thereof so that a communication packet whose destination is the management apparatus M1 is transmitted to the management apparatus M1, and a communication packet whose destination is the first host server SVR1 is transmitted to the first host server SVR1. The communication packet whose destination is the management apparatus M1 is a communication packet including the IP address "192.168.1.5" as the destination IP address, which has been set to the management apparatus M1. In addition, the communication packet whose destination is the first host server SVR1 is a communication packet including the IP address "192.168.1.10" as the destination IP address, which has been set to the first host server SVR1.

Upon receiving this request, the management module 31 of the first switch SW1 updates the packet transfer table (refer to FIG. 2) stored therein so that a communication packet whose destination is the management apparatus M1 is transmitted to the management apparatus M1, and a communication packet whose destination is the first host server SVR1 is transmitted to the first host server SVR1.

For example, the management module 31 of the first switch SW1 changes the packet transfer table T in FIG. 2 into the packet transfer table Ta in FIG. 21. The above change is performed so that, in the packet transfer table T in FIG. 2, the IP address "192.168.1.10" is removed from a cell at which the row having the port number 2 in the transmission port field and the column of the destination IP address field are intersected with each other.

Further, the change is performed so that, in the packet transfer table T in FIG. 2, the IP address "192.168.1.10" is added to the cell at which the row having the port number 3 in the transmission port field and the column of the destination IP address field are intersected with each other. Meanwhile, the IP address "192.168.1.13" in FIG. 2 and FIG. 21 will be described later.

The management module 31 of the first switch SW1 executes transfer of the communication packet by referring to the changed packet transfer table Ta.

In the above-described example, the transfer path updating module 20 also requests the third switch SW3 and the sixth switch SW6 to change the packet transfer paths thereof so that a communication packet whose destination is the management apparatus M1 is transmitted to the management apparatus M1, and a communication packet whose destination is the first host server SVR1 is transmitted to the first host server SVR1.

The third switch SW3 updates the packet transfer table stored therein so that a communication packet whose destination is the management apparatus M1 is transferred to the first switch SW1, and a communication packet whose destination is the first host server SVR1 is transferred to the sixth switch SW6.

Further, the sixth switch SW6 updates the packet transfer table stored therein so that a communication packet whose destination is the management apparatus M1 is transferred to the third switch SW3, and a communication packet whose destination is the first host server SVR1 is transferred to the first host server SVR1. Since the details of the update in the third switch SW3 and the sixth switch SW6 are similar to those described by exemplifying the first switch SW1 with reference to FIG. 21, the description thereof will not be made here.

Then, the transfer path updating module 20 requests the first host server SVR1 to change the packet transfer path so that a communication packet whose destination is the management apparatus M1 is transferred to the sixth switch SW6 via the port having the port number 2 (the port 2).

Upon receiving the request, the first host server SVR1 change the packet transfer path so that a communication packet whose destination is the management apparatus M1 is transferred to the sixth switch SW6 via the port 2 having the port number 2.

Further, the management module 11 of the management apparatus M1 reflects the changed monitoring path (the actual monitoring path) in the transfer path table T3 of FIG. 9 as described in the transfer path table T3a of FIG. 22.

In the above-described example, the changed path is the path 5. The management module 11 changes the transmission port of the first switch SW1 from "2" (refer to the row LN24 in FIG. 9) to "3" in the row LN24 of the transfer path table T3a. Then, the management module 11 changes SW2 (refer to the row LN25 in FIG. 9) to the third switch SW3 in the row LN25 of the transfer path table T3a. The management module 11 changes the reception port of the third switch SW3 from "3" (refer to the row LN25 in FIG. 9) to "1", and changes the transmission port of the third switch SW3 from "1" to "2" in the row LN25 of the transfer path table T3a.

Then, the management module 11 changes the fifth switch SW5 (refer to the row LN26 in FIG. 9) to the sixth switch SW6 in the row LN26 of the transfer path table T3a. The management module 11 changes the reception port of the sixth switch SW6 from "2" (refer to the row LN26 in FIG. 9) to "3" in the row LN26 of the transfer path table T3a.

The management module 11, also in the rows LN27, LN28, and LN29, appropriately changes an ID of the switch in the switch field, a port number in the reception port field, and a port number in the transmission port field as described in the rows L26, L25, and L24.

According to the process in S16, there is no overlapped path between the migration path and the monitoring path, and thus a delay in the monitoring communication due to the migration communication is reduced. As a result, the management apparatus M1 may suppress a delay in the communication with the first host server SVR1.

Step S17 in FIG. 18

S17: The delay-causing virtual machine specifying module 14 acquires IP addresses of virtual machines relating to the communication which causes the communication delay in the monitoring path. The management apparatus M1 acquires IP addresses of virtual machines relating to the communication which causes the communication delay in the monitoring path so as to determine whether or not the communication which causes the communication delay in the monitoring path is continued at a next monitoring timing.

The virtual machine relating to the communication which causes the communication delay in the monitoring path is, for example, a virtual machine in the middle of the migration. The delay-causing virtual machine specifying module 14 acquires, for example, IP addresses of virtual machines in the middle of the migration, from the source host server SRC (for example, the first host server SVR1).

The hypervisor of the first host server SVR1 monitors all the time, for example, whether or not a state of a virtual machine is normal, abnormal, or in the middle of the migration, and then manages a variety of information such as an IP address which has been set to the virtual machine.

The delay-causing virtual machine specifying module 14 instructs the hypervisor of the first host server SVR1 to notify the IP address of the virtual machine in the middle of the migration. In response to this instruction, the hypervisor notifies the delay-causing virtual machine specifying module 14 of IP addresses of virtual machines in the middle of the migration.

Step S21 in FIG. 19

S21: The monitoring path specifying module 13 specifies a path of monitoring which is actually executed for a virtual machine of the monitoring target. The path of the monitoring which is actually executed for the virtual machine of the monitoring target is appropriately referred to as an actual monitoring path of the virtual machine.

The monitoring path specifying module 13 acquires IP addresses stored in cells at which rows each having a type field of "VMGuest" in the management server information table T4 of FIG. 10 and the column of the IP address field are intersected with each other. Then, the monitoring path specifying module 13 determines an actual monitoring path for each of the virtual machines in a manner similar to S13 and S14.

For example, the monitoring path specifying module 13 acquires an IP address "192.168.1.13", which has been set to the first virtual machine VM1.

The monitoring path specifying module 13 specifies candidates for a monitoring path of the virtual machine to which the acquired IP address has been set. The virtual machine to which the acquired IP address has been set is appropriately referred to as a candidate virtual machine. Candidates for the monitoring path are all the network paths between the management apparatus M1 and the candidate virtual machine.

Specifically, the monitoring path specifying module 13 specifies, from among all the rows of the monitoring path table T2 in FIG. 8, rows each storing an IP address which has been set to the candidate virtual machine, in the monitoring target IP address field.

In a case where the IP address which has been set to the candidate virtual machine (for example, the first virtual machine VM1) is "192.168.1.13", the monitoring path specifying module 13 specifies the row LN42.

The monitoring path specifying module 13 extracts, from the monitoring path table T2, monitoring paths whose information is stored in a cell at which the specified rows and the column of the monitoring path field are intersected with each other. In the above-described example, the delay-causing path specifying module 12 extracts monitoring paths of the path 7 to the path 9, etc.

Next, the monitoring path specifying module 13 determines an actual monitoring path for each of the candidate virtual machines, based on the IP addresses which have been set to the candidate virtual machines, the extracted monitoring paths, and the transfer path table T3 in FIG. 9.

In the above-described example, an IP address set to the first virtual machine VM1 which is the candidate virtual machine is "192.168.1.13". The monitoring path specifying module 13 specifies all rows storing the IP address "192.168.1.13" (the LN30 to the LN32) in the destination IP address field of the transfer path table T3 in FIG. 9. The monitoring path specifying module 13 specifies the IDs of switches (the SW1, the SW2, and the SW5) which are included in the specified rows.

The monitoring path specifying module 13 specifies a path passing through all the switches identified by the specified IDs, from among the extracted monitoring paths of the path 7 to the path 9, etc. In other words, the monitoring path specifying module 13 specifies a monitoring path including all the specified IDs from the extracted monitoring paths.

In the above-described example, "[M1]=>[SW1-PRT1]=>[SW1-PRT2]=>[SW2-PRT3]=>[SW2-PRT1]=> [SW5-PRT2]=>[SW5-PRT1]=>[VM1-PRT1]" (the path 7) includes all the IDs of the specified switches (the SW1, the SW2, and the SW5). Accordingly, the monitoring path specifying module 13 determines the path 7.

Then, the monitoring path specifying module 13 determines whether or not the connection relationships between the ports in the determined path (the path 7) satisfies the relationships between the reception ports and the transmission ports in the specified rows (the LN30 to the LN32).

According to the row LN30, the communication packet (hereinafter, referred to as a communication packet WT2) including "192.168.1.13" is received in the first switch SW1 via the reception port 1, and then is transferred to the transmission port 2. The relationship between the reception port and the transmission port satisfies "[SW1-PRT1]=> [SW1-PRT2]=>" of the path 7.

According to the row LN31, the communication packet WT2 is received in the second switch SW2 via the reception port 3, and then is transferred to the transmission port 1. The relationship between the reception port and the transmission port satisfies "[SW2-PRT3]=>[SW2-PRT1]=>" of the path 7.

According to the row LN32, the communication packet WT2 is received in the fifth switch SW5 via the reception port 2, and then transferred to the transmission port 1. The relationship between the reception port and the transmission port satisfies "[SW5-PRT2]=>[SW5-PRT1]" of the path 7.

As described above, the monitoring path specifying module 13 determines that the connection relationships between the ports in the specified path of the path 7 satisfies all the relationships between the reception ports and the transmission ports in the specified rows (the LN30 to the LN32). Then, the monitoring path specifying module 13 determines the specified path of the path 7 as the actual monitoring path of the candidate virtual machine.

Step S22 in FIG. 19

S22: the virtual machine specifying module 15 compares the path of the communication which causes the communication delay of the monitoring communication (for example, the migration path) which is determined in S12 of FIG. 18 with the actual monitoring path of the virtual machine which is determined in S21, and then determines whether or not there is an overlapped portion therebetween.

In the above-described example, the migration path (the path 2) determined in S12 and the actual monitoring path (the path 7) determined in S21 share a path between the port 1 of the second switch SW2 and the port 2 of the fifth switch SW5 (refer to N6 in FIG. 1) and a path between the port 1 of the fifth switch SW5 and the port 1 of the first host server SVR1 (refer to N5 in FIG. 1).

Step S23 in FIG. 19

S23: The virtual machine specifying module 15 determines whether or not processing for all the virtual machines of the monitoring target (the candidate virtual machines) in S22 has been executed. That is, in a case where there are a plurality of the candidate virtual machines, the virtual machine specifying module 15 compares a path of the communication which causes the communication delay determined in S12 with the actual monitoring path for each of the plurality of candidate virtual machines through the processes in S22 and S23. Then, the virtual machine specifying module 15 specifies a candidate virtual machine which is monitored through a monitoring path whose portion or whole portion is shared by the path of the communication which causes the communication delay. Hereinafter, the specified candidate virtual machine is appropriately referred to as the specified virtual machine.

In a case where the process of all of the virtual machine of the monitoring target in S22 has been executed (YES in S23), the process proceeds to S24. In a case where the process of all of the virtual machine of the monitoring target in S22 is not executed (NO in S23), the process returns to S22.

Step S24 in FIG. 19

S24: The termination time specifying module 16 specifies an expected termination time of the communication which causes a delay of the monitoring communication (for example, the migration communication). Details of S24 will be described with reference to FIG. 20.

Step S25 in FIG. 19

S25: The monitoring path change determination module 17 compares the expected termination time of the communication which causes the communication delay with the time of the next monitoring timing (hereinafter, appropriately referred to as the next monitoring time of the specified virtual machine) of the specified virtual machine.

Specifically, the monitoring path change determination module 17 calculates the next monitoring time of the specified virtual machine, based on the monitoring timing table T5 in FIG. 11 and the monitoring history table T6 in FIG. 12. For example, it is assumed that the specified virtual machines are a first virtual machine VM1, a second virtual machine VM2, and a third virtual machine VM3. The monitoring intervals of the first virtual machine VM1, the second virtual machine VM2, the third virtual machine VM3 are respectively five minutes, ten minutes, and five minutes, according to the monitoring timing table T5 in FIG. 11.

According to the monitoring history table T6 in FIG. 12, the times at which the management apparatus M1 executes monitoring for the first virtual machine VM1, the second virtual machine VM2, and the third virtual machine VM3 (the last recorded time), are "14: 31: 22", "14: 41: 22", and "14: 33: 20", respectively. Accordingly, the management apparatus M1 calculates the next monitoring times for the first virtual machine VM1, the second virtual machine VM2, and the third virtual machine VM3 as "14: 36: 22" ("14: 31: 22"+"0: 5: 0"), "14: 51: 22" ("14: 41: 22"+"0: 10: 0"), and "14: 38: 20" ("14: 33: 20"+"0: 5: 0"), respectively.

Step S26 in FIG. 19

S26: The monitoring path change determination module 17 determines whether or not the communication which causes the communication delay is already completed at the next monitoring time of the specified virtual machine. In other words, the monitoring path change determination module 17 determines whether or not the monitoring communication of the specified virtual machine is executed after completing the communication which causes the communication delay.

A first case where the communication which causes the communication delay is already completed at the next monitoring time of the specified virtual machine (YES in S26), the process proceeds to S27.

Specifically, the monitoring path change determination module 17 determines whether or not the next monitoring time of the specified virtual machine is later than the expected termination time of the communication which causes the communication delay. A case where the next monitoring time of the specified virtual machine is later than the expected termination time of the communication which causes the communication delay is the first case.

Step S27 in FIG. 19

S27: The monitoring path change determination module 17 determines not to change the monitoring path of the specified virtual machine (hereinafter, appropriately referred to as a first determination). Since the communication which causes a delay in the monitoring communication (for example, the migration) is completed at the next monitoring time of the specified virtual machine, a delay does not occur in the monitoring communication of the specified virtual machine in the first case (YES in S26). Therefore, the monitoring path change determination module 17 makes the first determination.

On the other hand, in a second case where the communication which causes the communication delay is not completed yet at the next monitoring time of the specified virtual machine (NO in S26), the process of the monitoring path change determination module 17 proceeds to S28. The case where the next monitoring time of the specified virtual machine is earlier than the expected termination time of the communication which causes the communication delay in time is a second case.

Step S28 in FIG. 19

S28: The monitoring path change determination module 17 determines to change the monitoring path of the specified virtual machine (hereinafter, appropriately referred to as a second determination). Since the communication which causes a delay in the monitoring communication (for example, the migration) is not completed at the next monitoring time of the specified virtual machine, the delay is likely to occur in the monitoring communication of the specified virtual machine in the second case (NO in S26). Therefore, the monitoring path change determination module 17 makes the second determination.

In the above-described example, the next monitoring times of the first virtual machine VM1 to the third virtual machine VM3 are respectively "14: 36: 22", "14: 51: 22", and "14: 38: 20". Here, it is assumed that the expected termination time of the communication causing the communication delay, which is specified in S24, is "14: 40: 00".

In this example, the time point of the next monitoring time "14: 36: 22" of the first virtual machine VM1 is earlier than the expected termination time "14: 40: 00" of the communication which causes a delay in the monitoring communication (NO in S26). Accordingly, the monitoring path change determination module 17 determines to change the monitoring path of the first virtual machine VM1 (S28).

The time point of the next monitoring time "14: 51: 22" of the second virtual machine VM2 is later than the expected termination time "14: 40: 00" of the communication which causes a delay in the monitoring communication (YES in S26). Accordingly, the monitoring path change determination module 17 determines not to change the monitoring path of the second virtual machine VM2 (S27).

The time point of the next monitoring time "14: 38: 20" of the third virtual machine VM3 is earlier than the expected termination time of the communication which causes the communication delay of the monitoring communication "14: 40: 00" (NO in S26). Accordingly, the monitoring path change determination module 17 determines to change the monitoring path of the third virtual machine VM3 (S28).

Step S29 in FIG. 19

S29: The monitoring path change determination module 17 determines whether or not comparison has been executed for all the specified virtual machines. In a case where the comparison has been executed for all the specified virtual machines (YES in S29), the process proceeds to S30. In a case where the comparison has not been executed for all the specified virtual machines (NO in S29), the process returns to S25.

Specifically, the monitoring path change determination module 17 determines whether or not the processes for all of the specified virtual machines in S25 to S28 are completed.

That is, in a case where there are a plurality of the specified virtual machines, the monitoring path change determination module 17 compares the expected termination time of the communication which causes a delay in the monitoring communication, with the next monitoring time for each of the plurality of the specified virtual machines through the process in S26 (S25). Then, the monitoring path change determination module 17 determines whether or not the communication which causes the communication delay is already completed at the next monitoring time for each of the plurality of the specified virtual machines (S26), and whether to change the monitoring path for each of the plurality of the specified virtual machines (S27 and S28).

Hereinafter, the specified virtual machine which is determined to change the monitoring path is appropriately referred to as the virtual machine to be changed. In the above-described example, the virtual machines to be changed are the first virtual machine VM1 and the third virtual machine VM3.

Step S30 in FIG. 19

S30: In a case where there are a plurality of virtual machines to be changed, the change order determination module 18 determines the change order of the monitoring paths, based on each service levels of the plurality of virtual machines to be changed.

In detail, the change order determination module 18 determines a change order of a path of the monitoring communication for each of a plurality of monitoring targets, in a descending order of a service level which is defined for each of the plurality of monitoring targets.

Specifically, the change order determination module 18 specifies a service level for each of the plurality of virtual machines to be changed, based on the service level table T7 in FIG. 13. The change order determination module 18 determines the change order so that as a service level becomes higher, the actual change order of the monitoring path of the virtual machine to be changed becomes higher.

In the above-described example, according to the service level table T7 in FIG. 13, the service levels of the first virtual machine VM1 and the third virtual machine VM3 are respectively 99.999% and 99.9999%. That is, the service level of the third virtual machine VM3 (99.9999%) is higher than the service level (99.999%) of the first virtual machine VM1. Accordingly, the change order determination module 18 determines that the actual monitoring path of the third virtual machine VM3 is changed first, and the actual monitoring path of the first virtual machine VM1 is changed secondly.

Step S31 in FIG. 19

S31: The alternative monitoring path specifying module 19 determines an actual monitoring path of the virtual machine to be changed, which shares no portion thereof with the path of the communication causing a delay in the monitoring communication, which is specified in S12.

Note that, in a case where there are a plurality of actual monitoring paths of the virtual machine to be changed, each of which includes a portion that is not overlapped with each other, the alternative monitoring path specifying module 19 specifies the fastest monitoring path from among the plurality of monitoring paths. Then, the alternative monitoring path specifying module 19 requests the switches to change the packet transfer paths thereof.

Specifically, the alternative monitoring path specifying module 19 specifies, from all the rows of the monitoring path table T2 in FIG. 8, rows that store the IP address which is set to the virtual machine to be changed, in the monitoring target IP address field.

In a case where the IP address which is set to the virtual machine to be changed (for example, the first virtual machine VM1) is "192.168.1.13", the alternative monitoring path specifying module 19 specifies the row LN42.

The alternative monitoring path specifying module 19 extracts the monitoring paths stored in a cell at which the specified rows and the column of the monitoring path field are intersected with each other in the monitoring path table T2. In the above-described example, the alternative monitoring path specifying module 19 extracts the monitoring paths of the path 7 to (the path 9), etc. Then, the alternative monitoring path specifying module 19 further specifies monitoring paths each sharing no portion thereof with the path of the communication causing a delay in the monitoring communication, by comparing the migration path (the path 2) determined in S12 of FIG. 18 with the extracted monitoring paths.

The path 8 and the path 9 share no portion thereof with the migration path (the path 2). Accordingly, the alternative monitoring path specifying module 19 specifies the path 8 and the path 9 as the monitoring paths for change.

Next, the alternative monitoring path specifying module 19 determines the fastest monitoring path among the specified monitoring paths for change, based on the switch table T8 of FIG. 14. In FIG. 14, the bandwidth of each of all the ports in the fifth switch SW5 and the sixth switch SW6 is "10 Gbps", and the statuses of all the ports are "normal".

The alternative monitoring path specifying module 19 determines the above fastest monitoring path, based on a status of the switches (hereinafter, referred to as a configuration switches) which configure the monitoring path for change. As the number of the configuration switches becomes small (the number of pops is small) and the bandwidths of the ports of the configuration switches become large, the packet transfer time of the monitoring path becomes faster. Further, when the port status of the port connecting the configuration switches to each other in the monitoring path for change is "normal" rather than "lack of bandwidth", the packet transfer time of the monitoring path becomes faster.

The path 8 is "[M1]=>[SW1-PRT1]=>[SW1-PRT3]=> [SW3-PRT1]=>[SW3-PRT2]=>[SW6-PRT3]=>[SW6-PRT1]=>[VM1-PRT2]".

The number of the configuration switches (the SW1, the SW3, and the SW6) is three in the path 8. According to FIG. 14, the bandwidths of the ports of the above configuration switches (the SW1, the SW3, and the SW6) are each 10 Gbps. Then, according to FIG. 14, the port 1 of the first switch SW1, the port 3 of the first switch SW1, the port 1 of the third switch SW3, the port 2 of the third switch SW3, the port 3 of the sixth switch SW6, and the port 1 of the sixth switch SW6 are in a normal port state.

The path 9 is "[M1]=>[SW1-PRT1]=>[SW1-PRT4]=> [SW4-PRT4]=>[SW4-PRT3]=>[SW6-PRT4]=>[SW6-PRT1]=>[VM1-PRT2]".

The number of the configuration switches (the SW1, the SW4, and the SW6) is three in the path 9. According to FIG. 14, the bandwidths of the ports of the above configuration switches (the SW1, the SW4, and the SW6) are each 10 Gbps. However, according to FIG. 14, the port 4 of the first switch SW1, the port 3 of the fourth switch SW4, and the port 4 of the fourth switch SW4 are in a state of "lack of bandwidth".

As described above, the path 8 and the path 9 have the same number of the configuration switches and the same size of the bandwidths of the ports of the configuration switches except that there is a port in the state of "lack of bandwidth" in the configuration switch in the path 9.

Accordingly, the packet transfer time in the path 8 is faster than the packet transfer time in the path 9. That is, the path 8 is the fastest monitoring path.

The alternative monitoring path specifying module 19 determines the path 8 as the fastest monitoring path for the first virtual machine VM1. Then, the alternative monitoring path specifying module 19 determines the path 8 as the fastest monitoring path for the third virtual machine VM3, in a manner similar to the first virtual machine VM1.

As described above, the alternative monitoring path specifying module 19 determines an actual monitoring path of the virtual machine to be changed, which shares no portion thereof with the migration path determined in S12.

Step S32 in FIG. 19

S32: The transfer path updating module 20 requests the switches to change the packet transfer paths thereof.

Specifically, the transfer path updating module 20 requests the switches so that the actual monitoring path for each of the plurality of virtual machines to be changed is change to another monitoring path in accordance with the change order determined in S30.

In the example described in S30, it is determined that the actual monitoring path of the third virtual machine VM3 is changed first, and the actual monitoring path of the first virtual machine VM1 is changed secondly. Therefore, the transfer path updating module 20 first requests the switches to change the actual monitoring path of the third virtual machine VM3 to another monitoring path. The transfer path updating module 20 secondly requests the switches to change the actual monitoring path of the first virtual machine VM1 to another monitoring path.

Hereinafter, an example of the case of requesting the switches to change the actual monitoring path of the first virtual machine VM1 to another monitoring path will be described.

The transfer path updating module 20 requests the first switch SW1 to change the transfer path thereof so that a communication packet whose destination is the management apparatus M1 is transmitted to the management apparatus M1, and a communication packet whose destination is the first virtual machine VM1 is transmitted to the first virtual machine VM1. The communication packet whose destination is the management apparatus M1 is a communication packet including the IP address "192.168.1.5" as the destination IP address, which is set to the management apparatus M1. In addition, the communication packet whose destination is the first virtual machine VM1 is a communication packet including the IP address "192.168.1.13" as the destination IP address, which is set to the first virtual machine VM1.

Upon receiving this request, the management module 31 of the first switch SW1 updates the packet transfer table (refer to FIG. 2) stored therein so that a communication packet whose destination is the management apparatus M1 is transmitted to the management apparatus M1, and a communication packet whose destination is the first host server SVR1 is transmitted to the first virtual machine VM1.

For example, the management module 31 of the first switch SW1 changes the packet transfer table T in FIG. 2 into the packet transfer table Ta in FIG. 21. For example, in the packet transfer table T in FIG. 2, the IP address "192.168.1.13" is removed from a cell at which the row storing the port number 2 in the transmission port field and the column of the destination IP address field are intersected with each other.

Further, in the packet transfer table T in FIG. 2, the IP address "192.168.1.13" is added to a cell at which the row storing the port number 3 in the transmission port field and the column of the destination IP address field are intersected with each other.

The management module 31 of the first switch SW1 executes the transfer of the communication packet by referring to the changed packet transfer table Ta.

In the above-described example, the transfer path updating module 20 also requests the third switch SW3 and the sixth switch SW6 to change the transfer paths thereof so that a communication packet whose destination is the management apparatus M1 is transmitted to the management apparatus M1, and a communication packet whose destination is the first virtual machine VM1 is transmitted to the first virtual machine VM1.

The third switch SW3 updates the packet transfer table stored therein so that a communication packet whose destination is the management apparatus M1 is transferred to the first switch SW1, and a communication packet whose destination is the first virtual machine VM1 is transferred to the sixth switch SW6.

Further, the sixth switch SW6 updates the packet transfer table stored therein so that a communication packet whose destination is the management apparatus M1 is transferred to the third switch SW3, and a communication packet whose destination is the first virtual machine VM1 is transmitted to the first virtual machine VM1. Since details of the update in the third switch SW3 and the sixth switch SW6 are similar to that described by exemplifying the first switch SW1 with reference to FIG. 21, the description thereof will not be made here.

Then, the transfer path updating module 20 requests the first virtual machine VM1 to change the transfer path thereof so that a communication packet whose destination is the management apparatus M1 is transmitted to the sixth switch SW6 via the port having the port number 2 (the port 2).

Upon receiving the above request, the first virtual machine VM1 changes the transfer path thereof so that a communication packet whose destination is the management apparatus M1 is transmitted to the sixth switch SW6 via the port 2 of the port number 2.

Further, the management module 11 of the management apparatus M1 reflects the changed monitoring path (the actual monitoring path) in the transfer path table T3 in FIG. 9.

In the above-described example, the changed path is the path 8. As illustrated in FIG. 22, the management module 11 changes, the transmission port of the first switch SW1 from "2" (refer to the row LN30 in FIG. 9) to "3" in the row LN30 of the transfer path table T3a.

Then, the management module 11 changes SW2 (refer to the row LN31 in FIG. 9) to the third switch SW3 in the row LN31 of the transfer path table T3a. The management module 11 changes the reception port of the third switch SW3 from "3" to "1", and changes the transmission port of the third switch SW3 from "1" to "2" in the row LN31 of the transfer path table T3a.

Then, the management module 11 changes the fifth switch SW5 (refer to the row LN32 in FIG. 9) to the sixth switch SW6 in the row LN32 of the transfer path table T3a. The management module 11 changes the reception port of the sixth switch SW6 from "2" to "3" in the row LN32 of the transfer path table T3a.

Meanwhile, the case of requesting the switch to change the actual monitoring path of the third virtual machine VM3 to another monitoring path is the same as the case of requesting the switch to change the actual monitoring path of the first virtual machine VM1 to another monitoring path, and thus the description thereof will not be made here.

As described above, change order of a monitoring path of the monitoring target is determined in accordance with the service level thereof. Due to this, in a case where monitoring paths for a plurality of monitoring targets are changed, a monitoring path of a monitoring target having the higher service level may be changed to another monitoring path in a preferential manner. As a result, as the service level of the monitoring target becomes higher, the delay of the monitoring communication is suppressed, thereby maintaining the service level.

Specification of Expected Termination Time

Next, a process of specifying an expected termination time of the communication which causes a delay in the monitoring communication will be described with reference to FIG. 20 (S24 in FIG. 19).

Step S241 in FIG. 20

S241: The termination time specifying module 16 acquires data information of the virtual machine relating to the communication which causes a delay in the monitoring communication. The data information of the virtual machine relating to the communication which causes a delay in the monitoring communication is, for example, an image size of the virtual machine in the middle of the migration.

Specifically, in the management server information table T4 of FIG. 10, the termination time specifying module 16 extracts the image size which is stored in a cell at which a row storing the IP address, which is acquired in S17 of FIG. 18 and is set to the n-th virtual machine VMn in the middle of the migration, and a column of the image size field are intersected with each other. In a case where the virtual machine in the middle of the migration is the above-described n-th virtual machine VMn, the image size of the n-th virtual machine VMn is 30 GB.

Step S242 in FIG. 20

S242: The termination time specifying module 16 determines whether or not the communication which causes a delay in the monitoring communication has been executed in the past in the information processing system SYS.

Specifically, the termination time specifying module 16 determines whether or not the migration has been executed in the past in the information processing system SYS. In a case where the communication which causes a delay in the monitoring communication has been executed in the past in the information processing system SYS (YES in S242), the process proceeds to S243. In a case where the communication which causes a delay in the monitoring communication has not been executed in the past in the information processing system SYS (NO in S242), the process proceeds to S244.

For example, the termination time specifying module 16 determines whether or not at least one entry is stored in the migration execution history table T9 of FIG. 15. In a case of FIG. 15, three entries are stored. Therefore, the termination time specifying module 16 determines YES in S242. In the case, the above three entries represent the image sizes and the actual communication times for the virtual machines VM11, VM12, and VM13.

Step S243 in FIG. 20

S243: The termination time specifying module 16 determines (calculates) an expected termination time of the communication which causes a delay in the monitoring communication, based on the communication history. Specifically, the termination time specifying module 16 acquires the actual communication time for each communication in the past, which causes a delay in the monitoring communication, and the amount of data (the image size) from the migration execution history table T9 in FIG. 15. The termination time specifying module 16 determines a termination time of the communication which causes a delay in the monitoring communication, based on the acquired actual communication time and the amount of data for each communication.

For example, the termination time specifying module 16 acquire the image sizes and the actual communication times for all the virtual machines, from the migration execution history table T9 of FIG. 15.

Then, the termination time specifying module 16 specifies an expected communication time by using a linear function (y=ax+b) which is created based on the acquired image sizes and the actual communication times for the virtual machines. In this linear function, an x axis represents an image size (the unit is GB), and a y axis represents an expected communication time (the unit is minutes). In addition, in the above linear function, a and b are integers.

In a case of the migration execution history table T9 in FIG. 15, the image sizes and the actual communication times for the virtual machines VM11 and VM13 are respectively 30 GB and 10 minutes, and the image size and the actual communication time for the virtual machine VM12 are respectively 60 GB and 20 minutes. Accordingly, the termination time specifying module 16 calculates the linear function $$y=(1/3)x \qquad \text{(Equation 1)}$$

based on the acquired image sizes and the actual communication times for the virtual machines.

The termination time specifying module 16 anticipates an expected communication time required for completing the migration of the virtual machine (hereinafter, appropriately referred to as a required time), by substituting the image size of the virtual machine in the middle of the migration into the created linear function. In a case where the virtual machine in the middle of the migration is the n-th virtual machine VMn, according to the management server information table T4 in FIG. 10, the image size of the n-th virtual machine VMn is 30 GB. Accordingly, 10 minutes are obtained as a value of the y (the expected communication time, that is, the required time) by substituting "30" into the x in (Equation 1).

The termination time specifying module 16 determines, as an expected termination time for the ongoing migration of the virtual machine, a time that is obtained by adding the required time calculated using the function to a time of receiving an alarm about the virtual machine in the middle of the migration as illustrated in FIG. 17. The time at which the alarm is received corresponds to a time at which the communication which causes the communication delay in the monitoring path is started. In the above-described example, the time at which the alarm is received corresponds to the time at which the migration of the n-th virtual machine VMn is started.

For example, it is assumed that the time at which the alarm about the n-th virtual machine VMn in the middle of the migration is received is "14: 30: 00". The required time (the expected communication time) for the n-th virtual machine VMn in the middle of the migration is 10 minutes. As described above, the termination time specifying module 16 determines "14: 40: 00" ("14: 30: 00"+10 minutes) as the expected termination time of the n-th virtual machine VMn in the middle of the migration.

In this way, it is possible to determine an accurate expected termination time by specifying an expected communication time for the communication which causes a delay in the monitoring communication, based on the communication history.

Step S244 in FIG. 20

S244: the termination time specifying module 16 determines an expected termination time of the communication which causes a delay in the monitoring communication, based on data information of the virtual machine relating to the communication which causes a delay in the monitoring communication and the bandwidth of the communication which causes a delay in the monitoring communication.

Specifically, the termination time specifying module 16 acquires the bandwidth of a migration path via which the migration is actually executed, based on the switch table T8 in FIG. 14. Then, the termination time specifying module 16 calculates a required time (an expected communication time) of the migration for the virtual machine by dividing the image size (the unit is GB) of the virtual machine in the middle of the migration by the acquired bandwidth (the unit is Gbps).

In a case of the example described in S12 of FIG. 18, the migration path via which the migration is actually executed is the path 2 of "[SVR1-PRT1]=>[SW5-PRT1]=>[SW5-PRT2]=>[SW2-PRT1]=>[SW2-PRT2]=>[SW8-PRT1]=>[SW8-PRT2]=>[SVR3-PRT1]".

Then, the bandwidth of the path 2 corresponds to the bandwidths of the switches configuring the path 2, that is, the bandwidths of the fifth switch SW5, the second switch SW2, and the eighth switch SW8. The size of the aforementioned bandwidth is 10 Gbps. Then, the image size of the virtual machine in the middle of the migration is 30×8 Gb (Gigabit). Accordingly, the termination time specifying module 16 anticipates that the required time of the migration for the virtual machine is 24 seconds, by calculating 30×8 (Gb)/10 (Gbps).

The termination time specifying module 16 determines, as an expected termination time in the middle of the migration of the virtual machine, a time that is obtained by adding the anticipated required time to a time at which the alarm about the virtual machine in the middle of the migration is received as illustrated in FIG. 17. Since the determination of the expected termination time has been described in S243, the description thereof will be omitted here.

According to a method of determining an expected termination time of the communication which causes a delay in the monitoring communication in S244, it is possible to determine the expected termination time even in a case where there is no communication history. After completing the processes in S243 and S244, the process proceeds to S25 in FIG. 19.

According to the embodiment described above, the monitoring path of the monitoring target is changed so as not to share an overlapped portion with the path of the communication for migration, or so as to make the overlapped portion shorter than that before change.

By changing the monitoring path as described above, an overlapped portion is not included between the path of the communication for migration and the monitoring path of the monitoring target, or an overlapped portion becomes shorter than before the change, and thus it is possible to suppress a delay in the monitoring communication with the monitoring target.

Second Embodiment

In the first embodiment, the communication for migration is described as an example of a communication which causes a delay in the monitoring communication. An example of another communication, which causes a delay in the monitoring communication, is a communication relating to the backup which stores data relating to the virtual machine being operated by the information processing apparatus (for example, the host server) in another apparatus. The data relating to the virtual machine is, for example, an image of the virtual machine. In addition, another apparatus is, for example, the management apparatus M1.

All Backup Paths

FIG. 23 is a diagram illustrating an example of a backup path table, according to an embodiment, which is, for example, stored as the backup path table T1a in a delay communication path storage area R1 of the storage 102 in FIG. 3 and FIG. 5. The delay communication path storage area R1 stores the backup path table T1a. A state in which the backup path table T1a is stored in the delay communication path storage area R1 is schematically indicated by ": T1" in the storage 102 of FIG. 3 and FIG. 5.

The backup path table T1a is a table for storing all possible backup paths.

The backup path table T1a includes a periodic backup target field, a periodic backup target IP address field, and a backup path field. The periodic backup target field stores an ID of a virtual machine which becomes a backup target. The backup target may be a host server.

The periodic backup target IP address field stores an IP address which is set to the host server or the virtual machine of the backup target. The backup path field stores information on a backup path between the management apparatus M1 and the backup target.

The backup path table T1a stores, in each of rows, an ID of a backup target, an IP address which is set to a host server or a virtual machine of the backup target, and information on a backup path between the management apparatus M1 and the backup target, in association with each other.

For example, the backup path between the management apparatus M1 and the first virtual machine VM1 is, for example, represented as "[SVR1-PRT1]=>[SW5-PRT1]=>[SW5-PRT2]=>[SW2-PRT1]=>[SW2-PRT3]=>[SW1-PRT2]=>[SW1-PRT1]=>[M1]" (the path 10).

Backup paths between the management apparatus M1 and the first host server SVR1 may include the other paths, such as the path 11 and the path 12 illustrated in the back up path table T1a of FIG. 23, but the description thereof will be omitted here.

Backup Execution History

FIG. 24 is a diagram illustrating an example of a backup execution history table, according to an embodiment, which is, for example, stored as the backup execution history table T9a in the migration history storage area R9 of the storage 102 in FIG. 3 and FIG. 5. The migration history storage area R9 is an area for storing the backup execution history table T9a. A state in which the backup execution history table T9a is stored in the migration history storage area R9 is schematically indicated by ": T9" in the storage 102 of FIG. 3 and FIG. 5.

The backup execution history table T9a stores an actually spent time from the start of the backup of the virtual machine to the end thereof (hereinafter, appropriately referred to as an actual communication time).

The backup execution history table T9a includes a virtual machine field, an image size field, and an actual communication time field. The virtual machine field stores an ID of a virtual machine for which the backup is executed. The image size field stores an image size of the virtual machine.

The actual communication time field stores an actually spent time for backing up the virtual machine.

The backup execution history table T9a stores, in each of rows, an ID of a virtual machine, an image size of the virtual machine, and an actual communication time of the backup for the virtual machine, in association with each other.

The management module 11 of the management apparatus M1, for example, periodically makes an inquiry of the host server operating a virtual machine, about an image size of the virtual machine and an actual communication time of backup for the virtual machine. The hypervisor of the host server stores the image size of the virtual machine, controls the execution of the backup of the virtual machine, and then stores the actual communication time for the backup.

Upon receiving an inquiry from the management module 11 of the management apparatus M1, the hypervisor of the host server transmits the ID of the virtual machine, the image size of the virtual machine, and the actual communication time of the virtual machine, which are stored therein, to the management apparatus M1.

Meanwhile, the hypervisor of the host server may transmit the ID of the virtual machine, the image size of the virtual machine, and the actual communication time of the virtual machine to the management apparatus M1, at a time of terminating the backup of the virtual machine.

Upon receiving an ID of the virtual machine, an image size of the virtual machine, and an actual communication time of the virtual machine, the management module 11 of the management apparatus M1 stores, in the back up execution history table T9a, the ID, the image size, and the actual communication time in association with each other.

Information Table for Detecting Delay

Next, a delay-detecting information table, which is stored in the switch SW, will be described. FIG. 25 is a diagram illustrating an example of a delay-detecting information table, according to an embodiment, which is, for example, stored as the delay-detecting information table T11a in the delay-detecting information storage area R11 of the storage 302 in FIG. 4 and FIG. 6. The delay-detecting information storage area R11 is an area for storing the delay-detecting information table T11a. A state in which the delay-detecting information table T11a is stored in the delay-detecting information storage area R11 is schematically indicated ": T11" in the storage 302 of FIG. 4 and FIG. 6.

The delay-detecting information table T11a is a table that is referred to by a switch when the switch detects a communication which causes a communication delay of the monitoring communication, for example, a backup communication. The configuration of the delay-detecting information table T11a is the same as the configuration of the delay-detecting information table T11 in FIG. 16.

The port name field stores, for example, "4972" and "4973" which are port numbers used to backup an image of the virtual machine. Meanwhile, "902" which is stored in the port name field is a port number used for the migration illustrated in FIG. 16.

Then, "UDP" is stored in a cell at which the row including the port numbers "4972" and "4973" and the column of the protocol field are intersected with each other. Further, "backup" is stored in a cell at which the row storing the port numbers "4972" and "4973" and the column of type field are intersected with each other.

Process of Switch

In a case where the management module 31 transfers a communication packet (YES in S1 of FIG. 17), the delay-causing communication detecting module 32 of the switch determines whether or not a destination port number of the transferred communication packet and a port number (for example, 4972) stored in the port name field of the delay-detecting information table T11a are matched with each other (S2 in 17). In a case where both the port numbers are matched to each other, the delay-causing communication detecting module 32 determines that the communication causing a communication delay of the monitoring communication is executed (YES in S2).

In a case where it is determined YES in S2, the communicating module 33 of the switch SW notifies the management apparatus M1 of an alert including identification information which identifies a communication destination and a communication source of the communication causing the communication delay of the monitoring communication and the type of this communication (S3 in FIG. 17). The communication which causes the communication delay of the monitoring communication is, for example, the communication for backup.

The above-described identification information includes a destination IP address and a source IP address which are included in a communication packet of the communication causing the communication delay of the monitoring communication. In the example of FIG. 25, the identification information includes a destination IP address and a source IP address which are included in the communication packet including the destination port number "4972". In addition, the type of this communication is the backup.

Process of Management Apparatus

Upon receiving an alert, the delay-causing path specifying module 12 of the management apparatus M1 specifies candidates for paths of the communication which causes the communication delay of the monitoring communication (S11 in FIG. 18). For example, the communication which causes the communication delay is a communication for the backup illustrates in FIG. 23. In the above backup, the candidates for the paths of the communication causing the communication delay are all the network paths between the first host server SVR1 and the management apparatus M1.

Specifically, the delay-causing path specifying module 12 specifies, from among all the rows in the back up path table T1a of FIG. 23, rows each storing the source IP address included in the alert in the periodic backup target IP address field. In a case where the source IP address included in the alert is "192.168.1.10", the delay-causing path specifying module 12 specifies the row LN51.

The delay-causing path specifying module 12 extracts the backup paths which are stored in a cell at which the specified rows and a column of the backup path field are intersected with each other in the back up path table T1a. In the above-described example, the delay-causing path specifying module 12 extracts, as the backup paths, the path 10, the path 11, etc.

The delay-causing path specifying module 12 determines a path of the communication which causes the communication delay of the monitoring communication (S12 in FIG. 18). The delay-causing path specifying module 12 determines a backup path via which the backup is actually executed, based on the destination IP address and the source IP address included in the alert, the backup path extracted in S11, and the transfer path table T3 of FIG. 9. Note that, the determination of the backup path via which the backup is actually executed is the same as the determination of the migration path via which the migration is actually executed as described in the first embodiment, therefore, the description thereof will be omitted here.

For example, the delay-causing path specifying module 12 determines the path 10 as a path of the backup via which the backup is actually executed.

Upon receiving the alert, the monitoring path specifying module 13 specifies the candidates for a monitoring path of the communication source server (hereinafter, appropriately referred to as a source host server BCK) of the communication which causes the communication delay (S13 in FIG. 18). In the above-described example, the source host server BCK is the first host server SVR1. In the case, the above candidates for the monitoring path are all the network paths between the management apparatus M1 and the first host server SVR1.

Hereafter, the management apparatus M1 sequentially executes the processes S14 to S16 of FIG. 18. Since the processes S14 to S16 are specifically described in the first embodiment, the description thereof will be omitted here.

The delay-causing virtual machine specifying module 14 acquires IP addresses of the virtual machines relating to the communication which causes the communication delay in the monitoring path (S17 in FIG. 18). The virtual machine relating to the communication which causes the communication delay in the monitoring path is a virtual machine in the middle of the backup. The virtual machine in the middle of the backup is, for example, the n-th virtual machine VMn.

The delay-causing virtual machine specifying module 14 acquires IP addresses of the virtual machines in the middle of the backup from the source host server BCK (for example, the first host server SVR1).

The delay-causing virtual machine specifying module 14 instructs the hypervisor of the first host server SVR1 to notify an IP address of a virtual machine in the middle of the backup. In response to this instruction, the hypervisor notifies the delay-causing virtual machine specifying module 14 of the IP address of the virtual machine in the middle of the backup.

Hereafter, the management apparatus M1 sequentially executes the processes after S21 in FIG. 19 which is described in the first embodiment. In the processes after S21 in FIG. 19, the termination time specifying module 16 determines an expected termination time of the communication which causes a communication delay of the monitoring communication (for example, the backup communication) (S24 in FIG. 19).

The termination time specifying module 16 acquires the data information of the virtual machine relating to the communication which causes the communication delay of the monitoring communication (S241 in FIG. 20). The data information of the virtual machine relating to the communication which causes the communication delay of the monitoring communication is, for example, an image size of the virtual machine in the middle of the migration. The termination time specifying module 16 acquires 30 GB of the image size for the n-th virtual machine VMn as described in S241 of FIG. 20.

The termination time specifying module 16 determines whether or not the communication which causes the communication delay of the monitoring communication has been executed in the past in the information processing system SYS (S242 in FIG. 20).

In a case where the communication which causes the communication delay of the monitoring communication has been executed in the past (NO in S242), the termination time specifying module 16 determines the expected termination time of the communication which causes the communication delay of the monitoring communication, based on the communication history (S243 in FIG. 20).

Specifically, the termination time specifying module 16 acquires the image sizes and the actual communication times for all the virtual machines in the back up execution history table T9a of FIG. 24.

Then, the termination time specifying module 16 specifies a termination time by using a linear function (y=ax+b) which is created based on the acquired image sizes and the actual communication times of the virtual machines. In this linear function, an x axis represents an image size (the unit is GB), and a y axis represents a termination time (the unit is minutes). In addition, in the above linear function, a and b are integers.

In a case of the backup execution history table T9a in FIG. 24, the image size and the actual communication time of the virtual machines VM21 and VM23 are respectively 30 GB and 20 minutes, and the image size and the termination time of the virtual machine VM22 are respectively 60 GB and 40 minutes. Accordingly, the termination time specifying module 16 creates a linear function $$y=(2/3)x,\qquad(\text{Equation 2})$$

based on the acquired image sizes and the actual communication times of the virtual machines.

The termination time specifying module 16 anticipates a time-period (hereinafter, appropriately referred to as a required time) taken to complete the backup of the virtual machine, by substituting the image size of the virtual machine in the middle of the backup into the created linear function. In a case where the virtual machine in the middle of the backup is the n-th virtual machine VMn, according to the management server information table T4 in FIG. 10, the image size of the n-th virtual machine VMn is 30 GB. Accordingly, 20 minutes are obtained as a value of the y (the expected communication time, or the required time) by substituting "30" into the x in Equation 2.

The termination time specifying module 16 determines, as the expected termination time in the middle of the backup of the virtual machine, a time that is obtained by adding the required time calculated using the function to a time at which the alarm about the virtual machine in the middle of the backup is received as illustrated in FIG. 17.

For example, it is assumed that a time at which the alarm about the n-th virtual machine VMn in the middle of the backup is received is "14: 30: 00". The required time for the n-th virtual machine VMn in the middle of the backup is 20 minutes. The termination time specifying module 16 determines "14: 50: 00" ("14: 30: 00"+20 minutes) as the expected termination time of the n-th virtual machine VMn in the middle of the backup.

Meanwhile, a communication which causes a communication delay of the monitoring communication has not been executed in the past (YES in S242 of FIG. 20), the termination time specifying module 16 executes the process in S244 of FIG. 20.

Specifically, the termination time specifying module 16 acquires information on the backup path via which the backup is actually executed, based on the switch table T8 in FIG. 14. Then, the termination time specifying module 16 calculates the required time of the backup for the virtual machine by dividing the image size (the unit is GB) of the virtual machine in the middle of the backup by the acquired bandwidth (the unit is Gbps). Since the calculation process for the required time is described in the first embodiment, the description thereof will be omitted here.

Then, the termination time specifying module 16 determines, as the expected termination time in the middle of the backup of the virtual machine, a time that is obtained by adding the anticipated required time to a time at which the alarm about the virtual machine in the middle of the backup is received as illustrated in FIG. 17.

As described above, the above-described management apparatus may execute change of a monitoring path in accordance with various types of communication which cause a communication delay of the monitoring communication.

Modification Example

The management apparatus M1 may dynamically create a migration path table T1 and a monitoring path table T2 at the time of receiving an alert from the switch SW, and store the created migration path table T1 and monitoring path table T2 in the storage 102.

As another example of a communication which causes a communication delay of the monitoring communication, there are various types of communication, for example, a communication for a file transfer protocol (FTP), a communication for a ssh file transfer protocol (SFTP), or the like. The management apparatus of the embodiment may execute change of a monitoring path win accordance with the various types of communication which causes the communication delay of the monitoring communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus comprising:
   a network interface card configured to perform a first communication with a host server to be monitored, through a first monitoring path in a communication network, the host server including a first processor;
   a memory; and
   a second processor coupled to the memory and configured to acquire state information indicating a state of the host server by communicating with the host server via the network interface card at a monitoring timing for monitoring the host server, wherein
   the second processor detects a use state of the first monitoring path;
   the second processor makes, based on the use state, a determination whether a delay is expected to occur at a next monitoring timing by anticipating the use state of the first monitoring path at the next monitoring timing; and
   upon determining that the delay is expected to occur in the first communication at the next monitoring timing, the second processor changes the first monitoring path to a second monitoring path different from the first monitoring path, and communicates with the host server via the network interface card through the changed second monitoring path.

2. The management apparatus of claim 1, wherein
the second processor makes the determination in a case where the use state indicates that the first monitoring path shares a common portion included therein with a second transmission path of a second communication that causes a delay in the first communication with the host server.

3. The management apparatus of claim 2, wherein
the second monitoring path is a path that shares no portion thereof with the second transmission path of the second communication or a path whose portion shared by the second transmission path is shorter than the common portion shared by both the first monitoring path and the second transmission path.

4. The management apparatus of claim 3, wherein
the second processor determines that the delay is expected to occur in the first communication at the next monitoring timing in a case where the second communication is expected to continue at the next monitoring timing.

5. The management apparatus of claim 3, wherein
the memory is configured to store information on a plurality of monitoring paths between the management apparatus and the host server; and
the second processor selects the second monitoring path from among the plurality of transmission paths whose information is stored in the memory.

6. The management apparatus of claim 2, wherein
the second processor detects the second communication, based on alert information indicating that the second communication has been executed, the alert information being notified from transfer apparatuses that are provided between the management apparatus and the host server.

7. The management apparatus of claim 2, wherein
the memory is configured to store connection information indicating connection relationships among a plurality of transfer apparatuses for transferring data;
the network interface card is coupled to the communication network including the plurality of transfer apparatuses, and communicates with the host server through the first monitoring path; and
the second processor:
acquires the connection information from the memory, acquires destination information indicating a destination of data corresponding to the second communication, from each of the plurality of transfer apparatuses, and
determines the second transmission path of the second communication, based on the acquired connection information and the destination information.

8. The management apparatus of claim 4, wherein
the memory is further configured to store, in association with each of a plurality of past communications associated with the second communication, an actual communication time from a start of the each second communication to an end of the each second communication, and an amount of data transmitted in each past communication; and
the second processor determines an expected termination time of the second communication based on the actual communication time and the amount of data of each past communication, and determines that the second communication is expected to continue at the next monitoring timing when the next monitoring timing is earlier than the expected termination time.

9. The management apparatus of claim 4, wherein
the memory is further configured to store an amount of data transmitted in the second communication and bandwidth information indicating a bandwidth of the second transmission path; and the second processor determines an expected termination time of the second communication, based on the amount of data and the bandwidth information stored in the memory, and determines that the second communication is expected to continue at the next monitoring timing when the next monitoring timing is earlier than the expected termination time.

10. The management apparatus of claim 2, wherein the second communication is a communication for migration that migrates a virtual machine being operated by a first host server, from the first host server to a second host server different from the first host server, so as to cause the virtual machine to be operated by the second host server.

11. The management apparatus of claim 2, wherein the second communication is a communication for backup that stores data relating to a virtual machine being operated by the host server in another host server.

12. The management apparatus of claim 1, wherein the memory is configured to store a service level defined in association with each of a plurality of host servers, the service level indicating a ratio of a time-period during which a normal operation is required, to a predetermined time-period, and when the second processor determines that the delay is expected to occur in the first communication at the next monitoring timing, the second processor determines, based on the service level, a change order of the first monitoring path for each of the plurality of host servers, and changes the first monitoring path for each host server to the second monitoring path for the each host server in accordance with the determined change order.

13. The management apparatus of claim 12, wherein the second processor determines the change order of the first monitoring path for each of the plurality of host servers in a descending order of the service level.

14. An information processing system comprising:
a host server including a first processor configured to execute an information process; and
a management apparatus including a memory and a second processor coupled to the memory, the second processor being configured to acquire state information indicating a state of the host server, by communicating with the host server via a first monitoring path at a monitoring timing for monitoring the monitoring target, wherein
the second processor of the management apparatus detects a use state of the first monitoring path;
the second processor of the management apparatus makes, based on the use state, a determination whether a delay is expected to occur at a next monitoring timing by anticipating the use state of the first monitoring path at the next monitoring timing; and
upon determining, based on the use state, that the delay is expected to occur in the first communication at the next monitoring timing, the second processor of the management apparatus changes the first monitoring path to a second monitoring path different from the first monitoring path, and communicates with the host server through the changed second monitoring path.

15. The information processing system of claim 14, wherein
the second processor of the management apparatus makes the determination in a case where the use state indicates that the first monitoring path shares a common portion included therein with a second transmission path of a second communication that causes a delay in the first communication with the host server.

16. The information processing system of claim 15, further comprising:
transfer apparatuses provided between the management apparatus and the host server, wherein
the second processor of the management apparatus detects the second communication, based on alert information indicating that the second communication has been executed, the alert information being notified from the transfer apparatuses.

17. A non-transitory, computer-readable recording medium having stored therein a program for causing a computer to execute a process, the process comprising:
acquiring state information indicating a state of a monitoring target by performing a communication with the monitoring target through a first monitoring path in a communication network at a monitoring timing for monitoring the monitoring target;
detecting a use state of the first monitoring path;
making, based on the use state, a determination whether a delay is expected to occur in the communication at a next monitoring timing by anticipating the use state of the first monitoring path at the next monitoring timing;
upon determining that the delay is expected to occur in the communication at the next monitoring timing, changing the first monitoring path to a second path different from the first path; and
communicating with the monitoring target through the changed second monitoring path.

* * * * *